United States Patent [19]
Kanaoka

[11] Patent Number: 6,040,549
[45] Date of Patent: Mar. 21, 2000

[54] LASER BEAM MACHINING APPARATUS AND CORRESPONDING METHOD WHICH EMPLOYS A LASER BEAM TO PRETREAT AND MACHINE A WORKPIECE

[75] Inventor: Masaru Kanaoka, Nagoya, Japan

[73] Assignee: Mitsubishi Denki Kabushiki Kaisha, Tokyo, Japan

[21] Appl. No.: 08/949,394

[22] Filed: Oct. 14, 1997

Related U.S. Application Data

[63] Continuation of application No. 08/395,826, Feb. 28, 1995, abandoned.

[30] Foreign Application Priority Data

Feb. 28, 1994 [JP] Japan ................................. 6-030262

[51] Int. Cl.⁷ .................................................. B23K 26/00
[52] U.S. Cl. ................................. 219/121.61; 219/121.64; 219/121.72; 219/121.85
[58] Field of Search .......................... 219/121.61, 121.62, 219/121.63, 121.64, 121.67, 121.72, 121.76, 121.77, 121.69; 364/474.08; 700/166

[56] References Cited

U.S. PATENT DOCUMENTS

| | | | |
|---|---|---|---|
| 4,638,145 | 1/1987 | Sakuma et al. | 219/121.61 |
| 4,675,500 | 6/1987 | Kunz et al. | 219/121.73 |
| 4,857,699 | 8/1989 | Duley et al. | |
| 4,877,939 | 10/1989 | Duley et al. | 219/121.76 |
| 4,900,893 | 2/1990 | Yamazaki et al. | 219/121.61 |
| 5,012,069 | 4/1991 | Arai | 219/121.62 |
| 5,073,687 | 12/1991 | Inagawa et al. | 219/121.7 |
| 5,268,556 | 12/1993 | Coyle, Jr. et al. | 219/121.76 |
| 5,444,211 | 8/1995 | Nakata et al. | 219/121.67 |
| 5,449,881 | 9/1995 | Nakata et al. | 219/121.67 |

FOREIGN PATENT DOCUMENTS

| | | |
|---|---|---|
| 3807476 | 9/1989 | Germany . |
| 4037211 | 5/1992 | Germany . |
| 41 04 256 A1 | 8/1992 | Germany . |
| 6092092 | 5/1985 | Japan . |
| 60-174289 | 9/1985 | Japan ................................. 219/121.72 |
| 63-33191 | 2/1988 | Japan ................................. 219/121.72 |
| 63112088 | 5/1988 | Japan . |
| 1122559 | 5/1989 | Japan . |
| 1122684 | 5/1989 | Japan . |
| 1271092 | 10/1989 | Japan . |
| 215892 | 1/1990 | Japan . |
| 4138888 | 5/1992 | Japan . |
| 4138889 | 5/1992 | Japan . |
| 4309480 | 11/1992 | Japan . |
| 4333386 | 11/1992 | Japan . |

OTHER PUBLICATIONS

Copy of German Patent Office Official Action and Translation (File No. 1915 06 768.1–34).

Research Disclosure, Kenneth Mason Publications Ltd., Apr., 1992, No. 336, p. 266.

Patent Abstracts of Japan, vol. 17, No. 201, Apr. 20, 1993 (Published Patent Appln. No. 4–344887).

*Primary Examiner*—Gregory Mills
*Attorney, Agent, or Firm*—Sughrue, Mion, Zinn Macpeak & Seas, PLLC

[57] ABSTRACT

A laser beam machining is carried out by irradiating beforehand the laser beam along a final locus for a main machining, under such a condition as to obtain an energy density for removing a galvanized layer as a surface substance of a work. Thereafter, the laser beam is irradiated to a bare area on which the zinc has been removed, while changing only the energy density according to a cutting condition to cut the work.

20 Claims, 23 Drawing Sheets

LASER BEAM MACHINING APPARATUS AND CORRESPONDING METHOD WHICH EMPLOYS A LASER BEAM TO PRETREAT AND MACHINE A WORKPIECE

This is a Continuation of application Ser. No. 08/395,826, filed Feb. 28, 1995 now abandoned.

BACKGROUND OF THE INVENTION

1. Field of the Invention

This invention relates to a laser beam machining method and a device applicable thereto which carry out a cutting and welding, etc. of a workpiece made of metal by use of a laser beam, particularly to a laser beam machining method and a device that perform machining under actual machining conditions after having machined the workpiece under preliminary machining conditions so as to improve a surface state of the workpiece.

2. Description of Background Art

Generally, in a laser beam machining of a workpiece made of metal such as carbon steel, stainless steel or aluminum, a laser beam is irradiated onto the workpiece while injecting an assist gas thereto. When a workpiece having a surface coated with a substance of low melting point, an evaporating substance of low melting point possibly intrudes into a working area during the machining operation. In this case, a work quality is deteriorated.

FIGS. 21 to 26 concern conventional cutting and welding techniques which attempt to solve this problem. In FIGS. 22–25, arrow 101 shows a machining direction or cutting direction by the laser beam 1.

One way to cope with the above disadvantage is disclosed in Japanese Patent Publication (Kokai) No. 4-333386, in which an assist gas is used when machining a material coated with a substance of low melting point by the laser beam, as shown in FIG. 21. This art intends to restrain evaporation of the low melting point substance and improve the quality of the machined product.

In FIG. 21, a laser beam 1 is radiated from a laser oscillator (not shown) and focused by a lens 2 onto a workpiece 3a or a galvanized iron sheet. The workpiece 3a has a surface covered with a galvanized layer 3b. A pair of gas bombs 4a and 4b contain therein oxygen ($O_2$) and argon (Ar), respectively, and supplies the gasses to a mixer 6. A machining head 7 has a nozzle 8 at its leading end so that it permits a mixed gas of oxygen and argon to be injected from the nozzle 8 toward a machining point 9 on the workpiece 3a.

An operation of the above device will be described hereunder.

The laser beam 1 going out of the laser oscillator is led to the machining head 7 by a bend mirror (not shown). Then, the laser beam 1 is focused by the lens 2 and irradiated from the nozzle 8 onto the machining point 9 of the galvanized layer 3b of the workpiece 3a. An energy density of the laser beam 1 at the galvanized layer 3b is changed according to the kind, the plate thickness or the machining speed of the workpiece 3a. Moreover, oxygen gas and argon gas are fed from the bombs 4a and 4b and mixed in the mixer 6. The mixed gas is conducted to below the condenser lens 2 in the machining head 7 and injected from the nozzle 8 onto the galvanized layer 3b along with the laser beam 1. The mixed gas is used to oxidize the zinc of the galvanized iron sheet, by the oxygen gas therein, into a zinc oxide or a zinc peroxide. As a result, the zinc does not evaporate and spatter is lessened, thereby enabling laser beam welding with less blowholes.

A technique disclosed in a Japanese Patent Publication (Kokai) No. 4-138888 divides a laser beam into two beams so that one beam peels a substance of low melting point and the other beam performs welding, as shown in FIG. 23.

In FIG. 23, the device has a laser oscillator 10 and a partial reflector Mm and a total reflector Ms.

The laser beam 1 going out of the laser oscillator 10 is divided into two beams through the partial reflector Mm, and one of the beams passes therethrough to the workpiece 3a so as to remove a coating substance such as the galvanized layer 3b. The other beam is reflected by the partial reflector Mm toward the total reflector Ms and further reflected by the total reflector Ms toward the workpiece 3a, thereby welding it. Thus, as the device moves the beams in a direction 101, it simultaneously carries out removing the coating substance of the work as well as welding.

A Japanese Patent Publication (Kokai) No. 63-112088 discloses welding method of a galvanized iron sheet that has a step for peeling zinc at a surface of a work, as shown in FIG. 24, and a welding step, as shown in FIG. 25.

As shown in FIG. 24, first, the machining head 7 is placed at a position above a normal machining position so that a focus position is located above the surface of the workpiece 3a. Moreover, an output power is decreased, then the laser beam 1 is radiated onto the galvanized layer 3b and moved in the direction 101 along layer 3b in order to peel it off so as to prepare a bare surface 3d of the workpiece 3a for after processing. Next, as shown in FIG. 25, the focus position is set nearer to the surface of the workpiece 3a, then the output power is increased to do welding work.

However, with the laser beam machining of FIG. 21 that uses the mixed gas as an assist gas, quality of the welding decreases if the thickness of the galvanized layer on the surface of the work is large. Moreover, oxygen gas of high purity is generally used as an assist gas in cutting work, so that, if the mixed gas is used also in the cutting work, machining capability thereof is very lowered. Therefore, there is a need to provide a welding method of a galvanized iron sheet having a thick galvanized layer.

FIG. 26 is a cross sectional view showing a welding bead 3e in but-welding a galvanized iron sheet having a galvanized layer thickness of 200 µm using a mixed gas as an assist gas. In the figure, blowholes 3f are produced in the welding bead 3e.

FIG. 22 shows a cause of deterioration in machining quality in a laser beam cutting of the galvanized iron sheet.

Referring to FIG. 22, as a workpiece 3a, comprising a galvanized iron sheet, is cut, the workpiece 3a is formed with a cut groove 3c. A vapor 11, comprising primarily zinc because of its low melted point, intrudes into the cut groove 3c.

As shown in FIG. 22, in the laser cutting of the galvanized iron sheet, the galvanized layer 3b is evaporated and the zinc vapor 11 goes into the cut groove 3c. Accordingly, the purity of oxygen gas in the cut groove 3c is lowered, causing large chips or flaws on a cut surface and drosses at a back surface of the work 3a. Clearly, the laser cutting should be done while preventing the zinc vapor 11 from intruding into the cutting groove 3c.

In the laser beam machining of FIG. 23, the workpiece 3a is welded by a second laser beam after the galvanized layer 3b is peeled off by a final laser beam, so that the welding as a main machining is carried out before the heat generated at the time of peeling of the coating layer 3b is cooled down. If the main machining is done when the machined part is kept heated, heat input is excessive, so that there arises a state of self-burning in the cutting work and a structure of jointed parts is hypertrophied and embrittled in the welding work. In case the positional relationship of the partial reflector Mm and the total reflector Ms is fixed, it is possible that the locuses of the laser beams which performing the peeling operation as pretreatment and the main machining do not coincide with each other if the locuses are made complicated. In case of adopting such a order to make the locuses coincide with each other, the device becomes complicated, expensive and of no practical use. Moreover, the device using the partial reflector Mm and the total reflector Ms is only applicable to linear machining.

In the art shown in FIGS. 24 and 25, since the output power is lowered and the focus is shifted as a machining condition to incinerate and remove galvanized zinc in the first step, the removing speed decreases. Though it is applicable to a galvanizing made of zinc that has a large absorption factor and a low melting point, it cannot be applied to a substance that has a low absorption factor and a high melting point. Moreover, it cannot flexibly deal with the removal of coating materials having different properties. Furthermore, it is necessary to accurately select the output power and speed and control the energy density of the laser beam under a high speed machining, according to a kind of the coating material, in order to properly incinerate and remove the coating material.

In addition, most soft steel materials have an oxide film produced on their surfaces during a rolling process in their manufacture. This oxide film is called a mill scale. In a laser beam machining of a soft steel material that has a thick mill scale layer or a thick and thin mottled layer, dispersion is induced. Namely, if the soft steel material with an oxide film of nonuniform thickness is cut, there is a variation in the absorption factor of the laser beam at the surface of the material. If the absorption factor varies widely, the workpiece quality during cutting is deteriorated. Also in welding the workpiece, if the absorption factor varies, a depth of penetration varies as well, so that a stable machining is impossible. If the welded part (welding bead) is contaminated with the oxide film of the work surface, welding strength is lowered.

Moreover, if the oxide film becomes greater than a certain thickness, cracks are discontinuously produced by thermal shock in laser beam machining, so that the oxide film may exist at one position of the laser beam, and may not exist at another position. As a result, if the soft steel material with the oxide film of nonuniform thickness is cut, there is a variation in the absorption factor of the laser beam at the surface of the material, as described above. If the absorption factor is varied, the work quality in cutting is deteriorated. Also in welding work, if the absorption factor varies, a depth of penetration also varies, so that stable machining is impossible.

Furthermore, rust is produced on the soft steel material if it is left in a high humidity environment for a long time. In laser cutting the part of material that is covered by rust there arises an abnormal combustion and the work quality is deteriorated. Also in laser beam welding of the rusted part, blowholes are produced in the welding bead. Namely, if the work surface is rusted, there is a variation in the absorption factor of the laser beam between rusted parts and non-rusted part. If the absorption factor varies, the work quality in cutting is affected. Also in welding, if the absorption factor varies, the width or depth of penetration varies, so that stable machining is impossible.

The larger work surface irregularity or surface roughness is, the more defects are caused in the work quality in the laser beam cutting.

The larger the surface roughness is, the more that a variation is caused in the absorption factor of the laser beam. The working speed is higher at a part that has a large surface roughness and absorption factor while the working speed is slower at a part that has a small surface roughness and absorption factor, so that work quality is not uniform. Unless the work surface is perpendicular to the radiating direction of the laser beam, flow of the assist gas is disturbed in the cutting groove, thereby causing defective cutting.

Moreover, in the laser beam welding of a high reflectivity material, the laser beam is reflected in machining, so that stable machining work is not possible.

SUMMARY OF THE INVENTION

In view of the above, it is an object of the invention to provide a laser beam machining method and a device applicable thereto that prepares a workpiece surface by a preliminary machining under a preliminary machining condition and carries out a main machining under a main machining condition, by use of a laser beam, so as to properly machine the workpiece.

It is another object of the invention to provide a laser beam machining method and a device applicable thereto that can make higher a removing speed of surface substances of a workpiece which have a variety of characteristics different from each other and which may hinder a main machining.

It is a further object of the invention to provide a laser beam machining method and a device applicable thereto that can easily improve a cutting quality or a welding quality without any change or complication of the laser beam machine itself.

It is still further object of the invention to provide a laser beam machining method and a device applicable thereto that can easily improve a cutting quality or a welding quality without any need to change the laser beam machine itself.

According to teachings of one preferred mode, a laser beam machining method comprises a preliminary machining step for pretreating a work and a main machining step for machining the workpiece along a final machining locus. The preliminary machining step includes steps for condensing a laser beam into a high energy density by use of a condensing optical system, and irradiating the laser beam along the final machining locus, under such a preliminary machining condition as to obtain an energy density different from an energy density in a main machining condition of the main machining step, so as to remove beforehand, material on the surface of the workpiece. The main machining step includes a step for irradiating the laser beam onto an area of the workpiece on which the surface material has been removed, while changing the energy density of the laser beam according to the main machining condition, so as to machine the workpiece.

A laser beam machining device according to the invention comprises a preliminary machining means for pretreating a workpiece and a main machining means for machining the work along a final machining locus. The preliminary machining means includes means for condensing a laser beam into a high energy density, and means for irradiating a leading end of a laser beam along the final machining locus, under such a preliminary machining condition as to obtain an energy density different from an energy density in a main machining condition of the main machining step, so as to remove beforehand a surface material of the workpiece. The main machining means includes means for irradiating the laser beam to an area of the workpiece on which the surface material has been removed, while changing the energy density of the laser beam according to the main machining condition, so as to machine the workpiece.

According to another preferred mode of the invention, a laser beam machining method comprises a preliminary machining step for pretreating a workpiece and a main machining step for machining the workpiece along a final machining locus. The preliminary machining step includes steps for condensing a laser beam into a high energy density, and irradiating a leading end of a laser beam along the final machining locus, under such a preliminary machining condition as to obtain an energy density different from an energy density in a main machining condition of the main machining step, so as to make uniform a surface roughness of the workpiece. The main machining step includes a step for irradiating the laser beam to an area of the workpiece on which the surface roughness has been made uniform, while changing the energy density of the laser beam according to the main machining condition, so as to machine the workpiece.

According to another preferred mode of the invention, a laser beam machining device comprises a preliminary machining means for pretreating a workpiece and a main machining means for machining the work along a final machining locus. The preliminary machining means includes means for condensing a laser beam into a high energy density, and means for irradiating a leading end of a laser beam along the final machining locus, under such a preliminary machining condition as to obtain an energy density different from an energy density in a main machining condition of the main machining step, so as to make uniform a surface roughness of the workpiece. The main machining means includes means for irradiating the laser beam to an area of the workpiece on which the surface roughness has been made uniform, while changing the energy density of the laser beam according to the main machining condition, so as to machine the workpiece.

According to still another preferred mode of the invention, a laser beam machining method comprises a preliminary machining step for pretreating a workpiece and a main machining step for machining the workpiece along a final machining locus. The preliminary machining step includes steps for irradiating a laser beam along the final machining locus, under such a preliminary machining condition as to obtain an energy density different from an energy density in a main machining condition of the main machining step, so as to groove the workpiece. The main machining step includes a step for irradiating the laser beam to the grooved area of the workpiece, while changing the energy density of the laser beam according to the main machining condition, so as to machine the workpiece.

According to still another preferred mode of the invention, a laser beam machining device comprises a preliminary machining means for pretreating a workpiece and a main machining means for machining the workpiece along a final machining locus. The preliminary machining means includes means for irradiating a laser beam along the final machining locus, under such a preliminary machining condition as to obtain an energy density different from an energy density in a main machining condition of the main machining step, so as to groove the workpiece. The main machining means includes means for irradiating the laser beam to the grooved area of the workpiece, while changing the energy density of the laser beam according to the main machining condition, so as to machine the workpiece.

According to still another preferred mode of the invention, a laser beam machining method comprises a preliminary machining step for pretreating a workpiece and a main machining step for machining the work along a final machining locus. The preliminary machining step includes a step for irradiating a laser beam along the final machining locus, under such a preliminary machining condition as to obtain an energy density different from an energy density in a main machining condition of the main machining step, so as to groove the workpiece. The main machining step includes steps for irradiating the laser beam to the grooved area of the work, while changing the energy density of the laser beam according to the main machining condition, so as to machine the workpiece. The preliminary machining step further includes a step for inclining an irradiating direction of the laser beam and an injecting direction of an assist gas relative to the surface of the workpiece. The main machining step further includes a step for making the irradiating direction of the laser beam and the injecting direction of the assist gas relative to the surface of the workpiece.

According to still another preferred mode of the invention, a laser beam machining device comprises a preliminary machining means for pretreating a workpiece and a main machining means for machining the workpiece along a final machining locus. The preliminary machining means includes means for irradiating a laser beam along the final machining locus, under such a preliminary machining condition as to obtain an energy density different from an energy density in a main machining condition of the main machining step, so as to groove the workpiece. The main machining means includes means for irradiating the laser beam to the grooved area of the workpiece, while changing the energy density of the laser beam according to the main machining condition, so as to machine the workpiece. The preliminary machining means further includes means for inclining an irradiating direction of the laser beam and an injecting direction of an assist gas relative to the surface of the workpiece. The main machining means further includes means for making the irradiating direction of the laser beam and the injecting direction of the assist gas relative to the surface of the workpiece.

According to still another preferred mode of the invention, a laser beam machining method comprises a preliminary machining step for pretreating a workpiece and a main machining step for machining the work along a final machining locus. The preliminary machining step includes steps for irradiating a laser beam along the final machining locus, under a preliminary machining condition of an assist gas containing an oxygen gas for oxidizing a surface of the work that is different from a main machining condition for welding of the main machining step, so as to oxidize the surface of the workpiece.

The main machining step includes a step for irradiating the laser beam to an oxidized area of the work, while changing the energy density of the laser beam according to the main machining condition, so as to machine the workpiece.

According to still another preferred mode of the invention, a laser beam machining device comprises a preliminary machining means for pretreating a workpiece and a main machining means for machining the workpiece along a final machining locus. The preliminary machining means includes means for irradiating a laser beam along the final machining locus, under a preliminary machining condition of an assist gas containing an oxygen gas for oxidizing a surface of the work that is different from a main machining condition for welding of the main machining step, so as to oxidize the surface of the workpiece. The main machining means includes means for irradiating the laser beam to an oxidized area of the workpiece, while changing the energy density of the laser beam according to the main machining condition, so as to machine the workpiece.

According to still another preferred mode of the invention, a laser beam machining method comprises a preliminary machining step for pretreating a workpiece and a main machining step for machining the workpiece along a final machining locus. The preliminary machining step includes steps for irradiating a laser beam along the final machining locus, under such a preliminary machining condition as to evenly obtain an energy density and an energy distribution different from an energy density and an energy distribution in at least one of main machining conditions for cutting and welding and thermal treatment of the main machining step, so as to remove beforehand a surface substance of the workpiece. The main machining step includes a step for irradiating the laser beam to an area of the workpiece on which the surface substance has been removed, while changing the energy density and the energy distribution of the laser beam according to the main machining condition, so as to machine the workpiece.

According to still another preferred mode of the invention, a laser beam machining device comprises a preliminary machining means for pretreating a workpiece and a main machining means for machining the workpiece along a final machining locus. The preliminary machining means includes means for irradiating a laser beam along the final machining locus, under such a preliminary machining condition as to evenly obtain an energy density and an energy distribution different from an energy density and an energy distribution in at least one of main machining conditions for cutting and welding and thermal treatment of the main machining step, so as to remove beforehand a surface substance of the workpiece. The main machining means includes means for irradiating the laser beam to an area of the work on which the surface substance has been removed, while changing the energy density and the energy distribution of the laser beam according to the main machining condition, so as to machine the workpiece.

Further objects and advantages of the invention will be apparent from the following description, reference being had to the accompanying drawings, wherein preferred embodiments of the invention are clearly shown.

DESCRIPTION OF PREFERRED EMBODIMENTS

Figure 1:
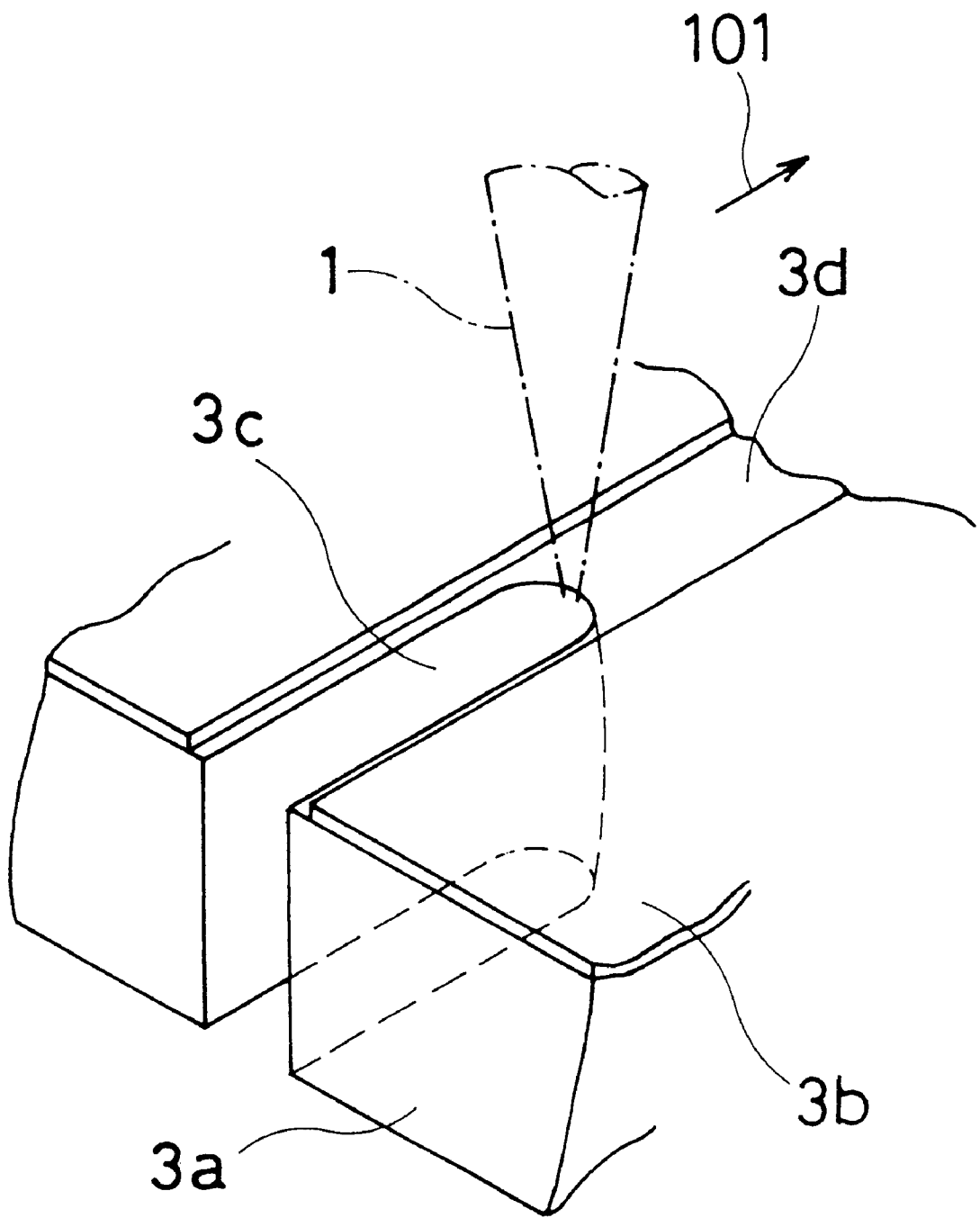
FIG. 1 is a perspective view showing a laser beam cutting state after having removed a galvanized layer on a surface of a galvanized iron sheet workpiece by use of a first embodiment of the inventive laser beam machining method and device.

Referring to the accompanying drawings, wherein like reference characters designate like or corresponding parts throughout the several views, preferred modes of an inventive laser beam machining method and device will be described hereafter. Like reference characters also are used for designating the same parts referred to in the description of the related art, thereby avoiding redundancy.

FIRST EMBODIMENT

FIG. 1 is a perspective view showing a laser beam while it is cutting, after having removed a galvanized layer on a surface of a galvanized iron sheet by use of a first embodiment of an inventive laser beam machining method and an inventive device.

Referring to FIG. 1, the laser beam 1 is produced by a device, including laser beam oscillator, an optical system including lens and the like (not shown) and the laser beam 1 is irradiated onto the surface of a workpiece 3a, e.g. a galvanized iron sheet. The inventive method and device is applied to a variety of machining operations including cutting, welding, etc., although FIG. 1 shows the cutting of a workpiece. In FIG. 1, the workpiece 3a has a galvanized layer 3b removed by the laser beam 1, and a bare surface 3d is exposed and cut with a cut groove 3c.

The inventive laser beam machining device has improvements in its software structured in a microprocessor (not shown), and its detailed description of mechanical structure will be omitted. The inventive software is apparent from the following description and a flowchart of FIG. 4.

The laser beam machining method is described next. In a preliminary machining step which is a first stage, the laser beam 1 is condensed into a high energy density beam that is irradiated onto a final machining locus that is the same as the main machining locus, thereby removing beforehand the galvanized layer on the surface and preparing a bare surface 3d of the workpiece 3a. The preliminary step is carried out under a preliminary machining condition for obtaining an energy density different from an energy density in a main machining condition for cutting operations. In a main machining step which is a second stage, the laser beam 1 is irradiated onto the bare surface 3d of the workpiece 3a to cut it, in an energy density that is changed according to the maim machining condition for the laser beam cutting.

Namely, in the first stage of machining, the preliminary machining condition is predetermined for removing the galvanized layer 3b on the surface of the workpiece 3a, thereby machining it under such a condition by use of a machining program for making the laser beam 1 trace a desired outline of a finally machined product. In the second stage of machining, the laser beam 1 is returned to an initial machining position of the machining program. Then, a predetermined main machining condition is set thereby cutting the workpiece 3a along a length of the bare surface 3d, that is the same locus as the cutting locus. In the cutting operation, no zinc vapor is generated, so that purity of oxygen gas as an assist gas is kept high and the work quality is improved.

Figure 2:
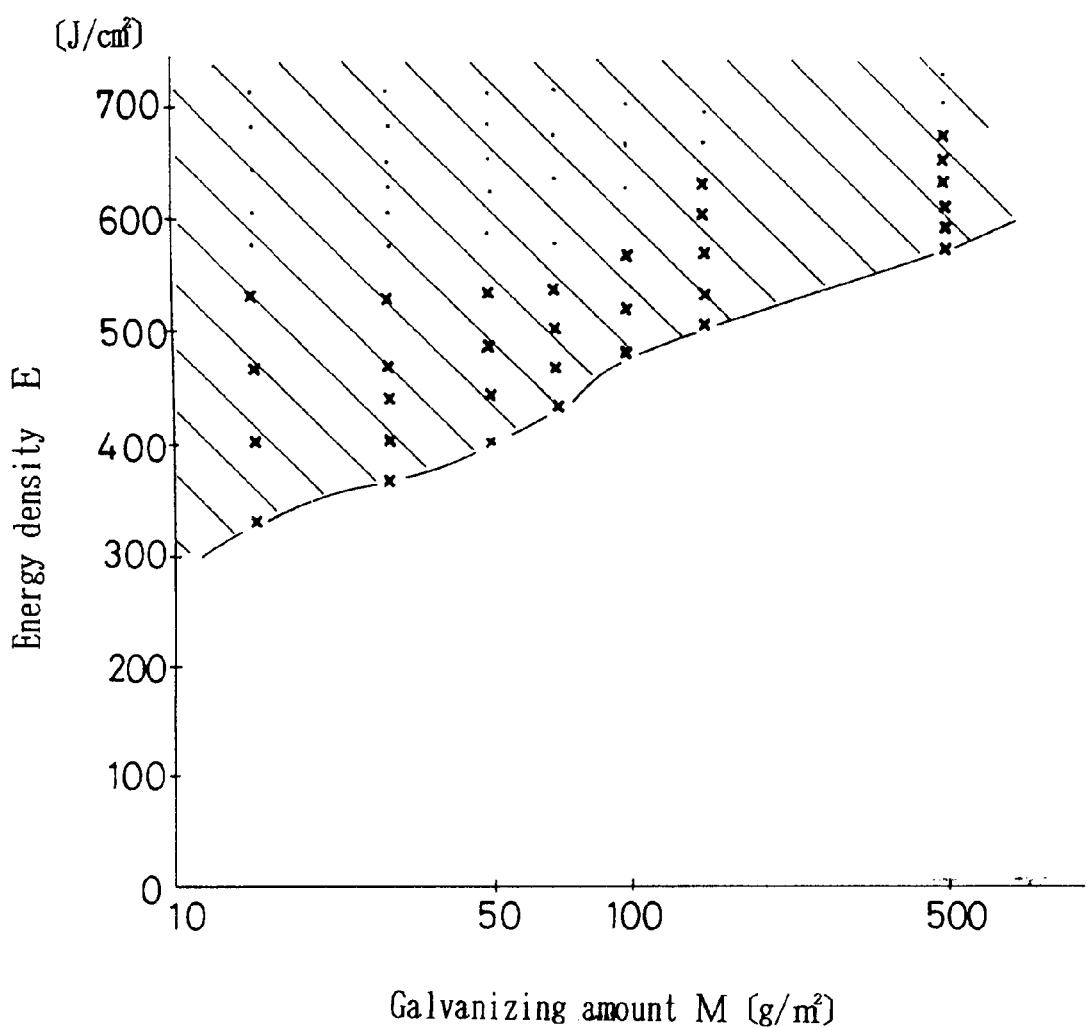
FIG. 2 is an explanatory drawing showing a relation between a galvanizing amount M in the galvanized iron sheet and an energy density E of a laser beam necessary for removing a galvanized layer at an irradiated part, according to the first embodiment of the inventive laser beam machining method and device.

FIG. 2 is an explanatory drawing showing a relation between a galvanizing amount M [g/m$^2$] in the galvanized iron sheet and an energy density E [J/cm$^2$] of the laser beam 1 necessary for removing the galvanized layer 3b at an irradiated part.

The energy density E is represented by the following expression (1) showing a relation of a laser output power P [W], a machining speed V [cm/s] and a machining width L [cm].

$$E=P/(V \cdot L) \tag{1}$$

An area specified by slanting lines in FIG. 2 show s an energy density E that can perfectly remove the zinc. It is preferable, in view of machining efficiency, to set the preliminary machining condition so as to obtain a lowest energy density, as long as it can remove the zinc, with a high machining speed, in accordance with the galvanizing amount M. Referring to FIG. 2, a relation shown by the following expression (2) is formed between each galvanizing amount M and the lowest energy density E.

$$E=74 \cdot \ln M+130 \tag{2}$$

Figure 3:
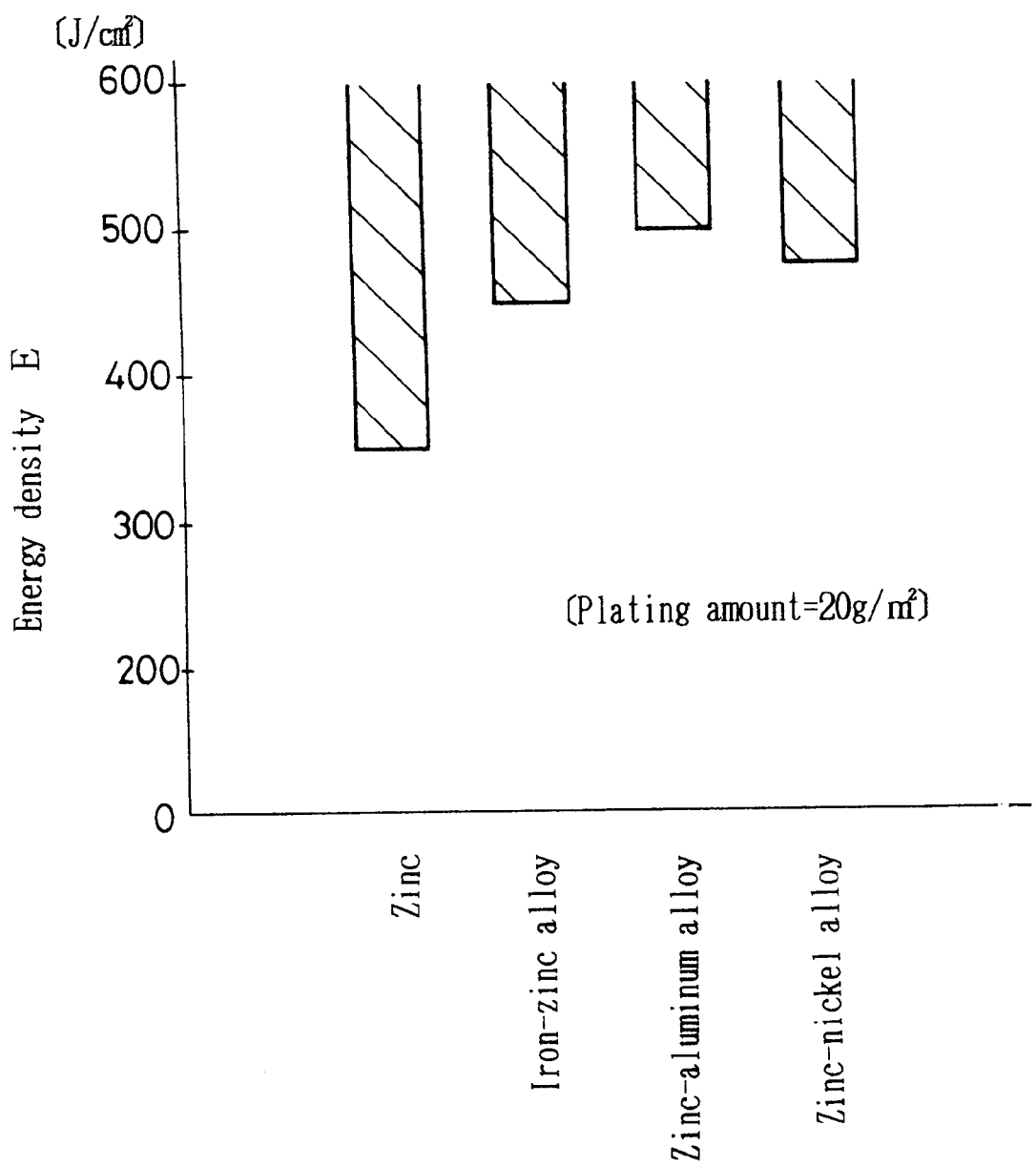
FIG. 3 is an explanatory drawing showing a relation between a kind of coating material having a plating amount (M=20 g/m$^2$) and an energy density E of a laser beam necessary for removing it, according to the first embodiment of the inventive laser beam machining method and device.

FIG. 3 is an explanatory drawing showing a relation between coating metallic material having a plating amount (M=20 g/m$^2$) and an energy density E [J/cm$^2$] of the laser beam 1 necessary for removing the metal.

The preliminary machining condition is preferably set so as to obtain an energy density E shown by slanting lines in FIG. 3 with a highest machining speed, in accordance with an absorption factor of the laser beam 1 and a melting point for each coating material. As a result of an experiment, the coating material can be removed with a lower energy density E, in order of a zinc-aluminum alloy, a zinc-nickel alloy, an iron-zinc alloy and a zinc. Relations of the following expressions (3) to (6) are formed between the plating amount of these coating materials and the energy density E necessary for removing them, wherein the energy density for the zinc-aluminum alloy is shown as Ea, the energy density for the zinc-nickel alloy as En, the energy density for the iron-zinc alloy as Ef, the energy density for the zinc as E.

$$Ea = 80 \cdot \ln M + 260 \quad (3)$$

$$En = 78 \cdot \ln M + 241 \quad (4)$$

$$Ef = 76 \cdot \ln M + 222 \quad (5)$$

$$E = 74 \cdot \ln M + 130 \quad (6)$$

Figure 4:
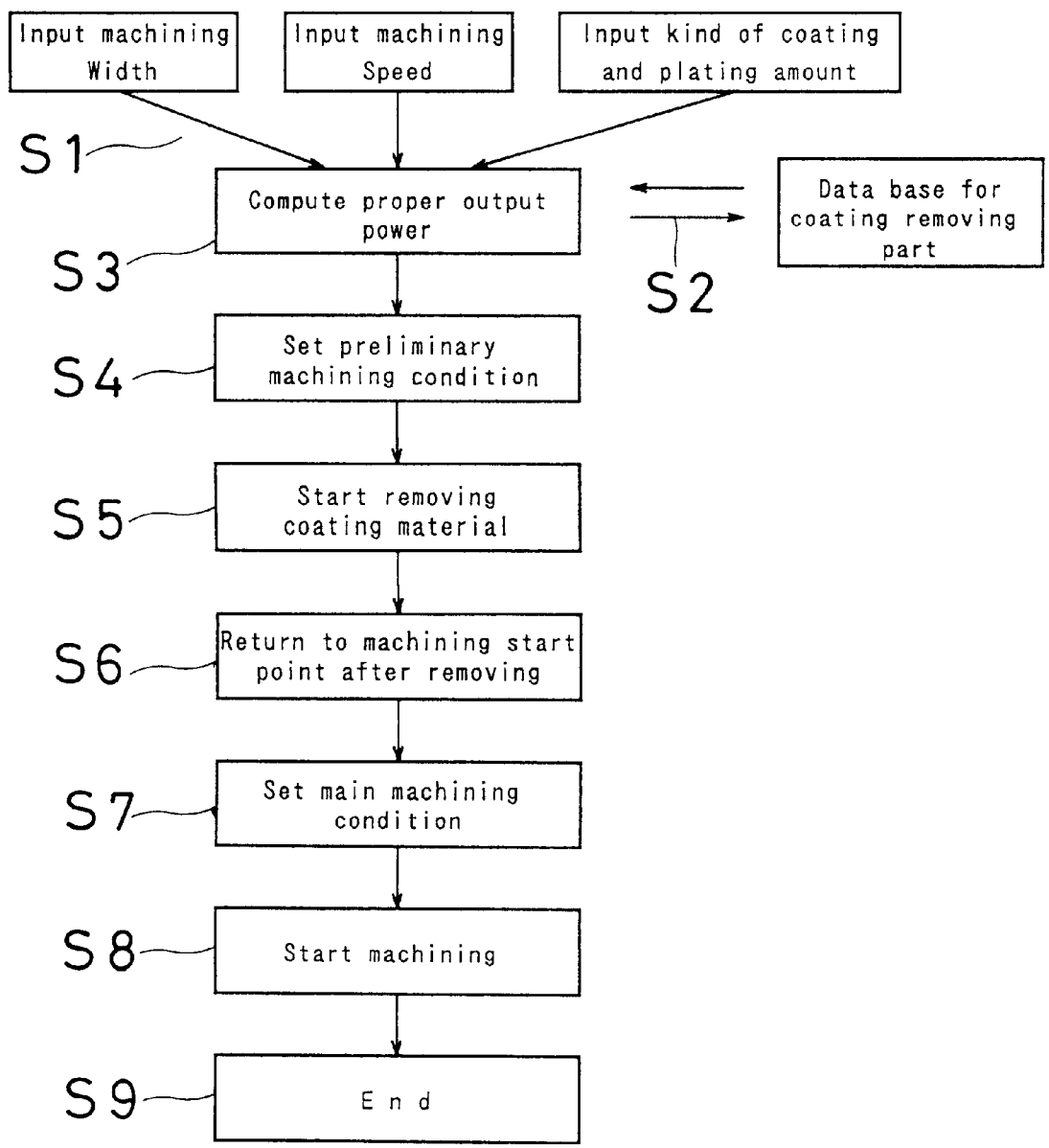
FIG. 4 is a flowchart showing a machining process of the first embodiment of the inventive laser beam machining method and device.

Energy density for removing the coating materials is stored in a memory of the microprocessor, which constitutes the inventive laser beam machining device, in the form of the above expressions (3) to (6), according to the plating amount and a property of the coating material. Moreover, the output power can be set into a desired one from the expression (1) in accordance with a required machining width and a machining speed. FIG. 4 is a flowchart showing a machining process of this embodiment. The flow chart is self explanatory, and in step S1, parameters are input by an operator and in step S3, the proper output is computed on the basis of data exchanged with a database in step S2. A preliminary machining condition is set in step S4 and coating material is removed in step S5. After removal, the beam is returned to a start point in step S6, the main machining condition is set in step S7 and main machining begins in step S8 and ends at step S9. This process may be automatically executed by a variety of coded commands in the machining program.

Figure 5:
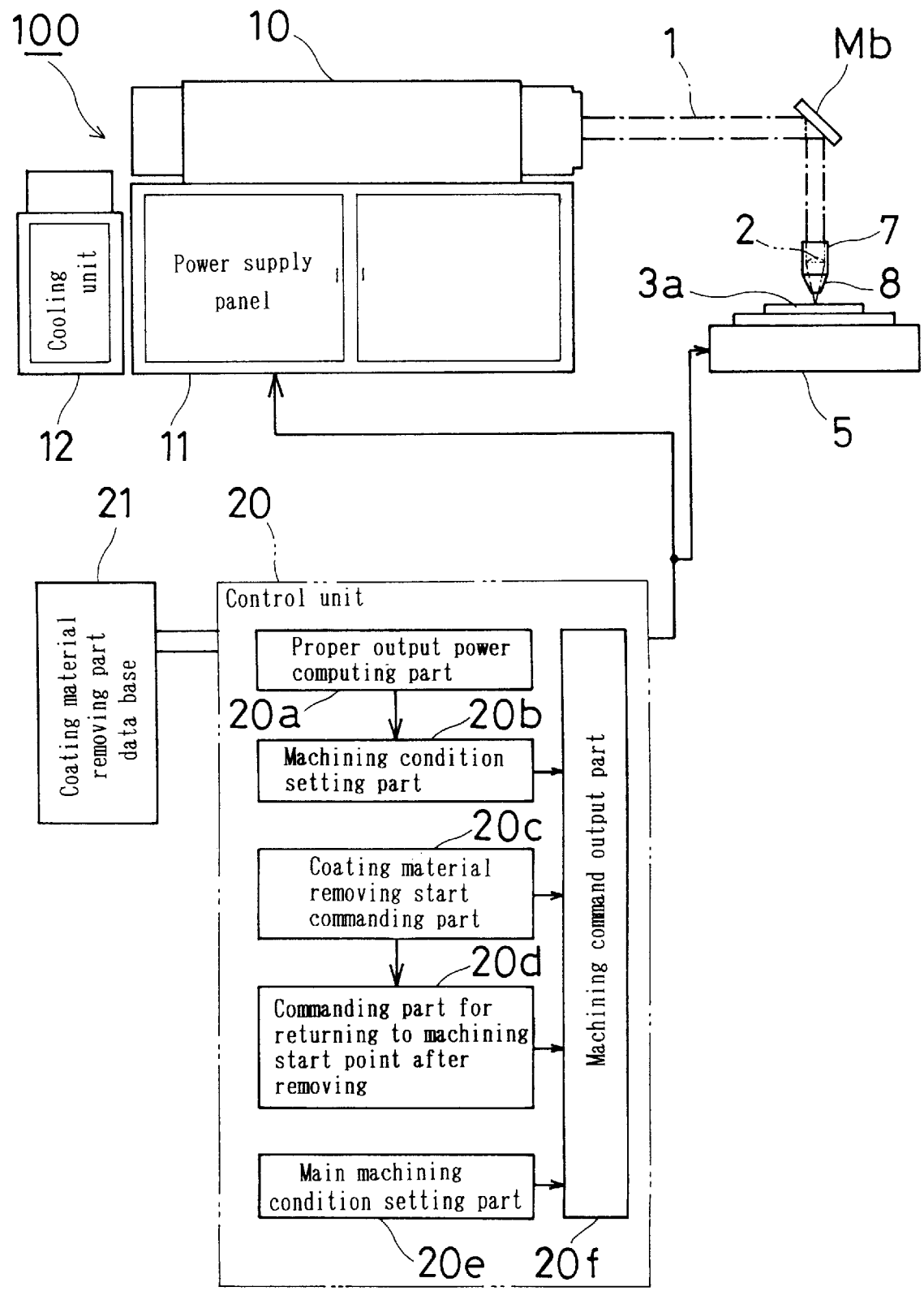
FIG. 5 is a schematic view showing an overall structure of a laser beam machining method and a laser beam machining device used for the method according to first to eighth embodiments of the invention.

FIG. 5 is a schematic view showing an overall structure of a laser beam machining method and a laser beam machining device used for the method according to a first to eighth embodiments of the invention.

In the figure, a laser beam machine 100 is mainly composed of a laser oscillator 10 incorporating a resonator (not shown), a power supply panel 11, a cooling unit 12, a machining head 7 and a control unit 20 which is formed of well-known CPU, ROM, RAM and the like while having a coating material removing part data base 21. A laser beam 1 is radiated from the laser oscillator 10 and conducted by a bend mirror Mb to the machining head 7. The laser beam 1 conducted to the machining head 7 is focused by a lens 2 which is built in the head 7. The focused laser beam 1 is irradiated from a nozzle 8 disposed at a leading end of the head 7 to a surface of a workpiece 3a which is secured on a machining table 5.

At this time, an energy density of the laser beam 1 is calculated in the proper output computing part 20a of the control unit 20 by use of the coating material removing part data base 21 and is outputted into the machining condition setting part 20b, as shown in FIG. 5, on the basis of data such as a machining width, a machining speed, a kind or a plating amount of a coating, in accordance with a operating process shown in FIG. 4. Output data from the machining condition setting part 20b are outputted through the machining command output part 20f. Output data from the coating material removing start commanding part 20c and the return commanding part 20d are outputted through the machining command output part 20f. A main machining condition after removing the coating material is set in the main machining condition setting part 20e and outputted through the machining command output part 20f. A machining condition or operation of the laser oscillator 10 or machining table 5 is controlled on the basis of the output data from the machining command output part 20f.

Figure 6:
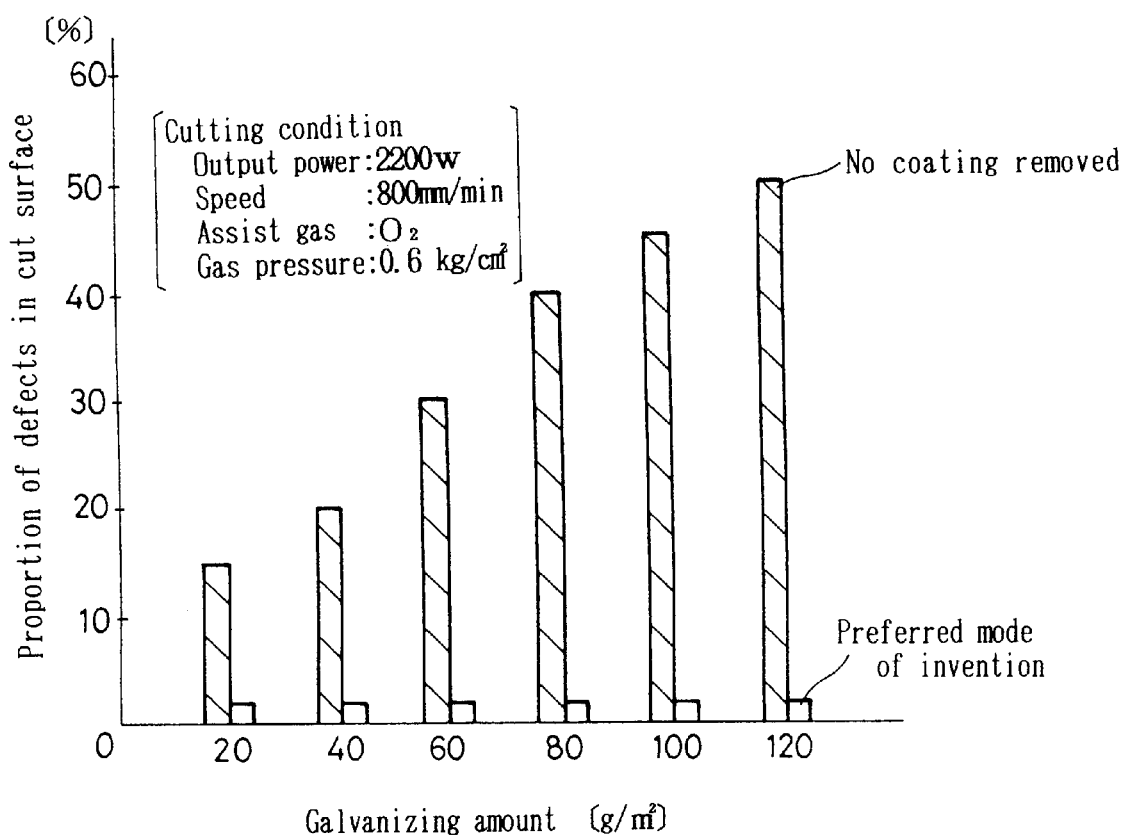
FIG. 6 is an explanatory drawing showing the proportion of defects in a cut surface to a galvanizing amount, while comparing a value in the first embodiment of the inventive laser beam machining method and device with a value in an art which has no coating removed.

FIG. 6 is an explanatory drawing showing a proportion of defects [%] of a cut surface to a galvanizing amount [g/m$^2$] while comparing the value of the present embodiment with that of related art. Here, data obtained by cutting a soft steel material 16 mm thick with the galvanizing layer left thereon is called "related art", and data obtained by cutting the soft steel material 16 mm thick which has the galvanizing layer removed is called "preferred mode of invention" or the present embodiment.

For the work of removing the coating in the embodiment, a condition was selected from the expression (2) so that a machining width of 5 mm and a speed of 2000 mm/min were possible. For all the cutting works in the embodiment and related art, conditions are set to have an output power of 2200 W and a machining speed of 800 mm/min, while oxygen ($O_2$) is used as an assist gas and its gas pressure is set in 0.6 kg/cm$^2$.

In the method of the related art, the proportion of defects increases substantially in proportion to the galvanizing amount (thickness of galvanized layer). In the present embodiment, the proportion of defects is about 2% to each galvanizing amount.

With the method and the device of the present embodiment, the quality of the cut workpiece 3a is very good and satisfactory.

While the present embodiment is described with respect to a galvanized coating, the invention is applicable to any coating materials and the same advantageous effects are obtained, if it has a lower melting point than that of a base metal.

SECOND EMBODIMENT

Figure 7:
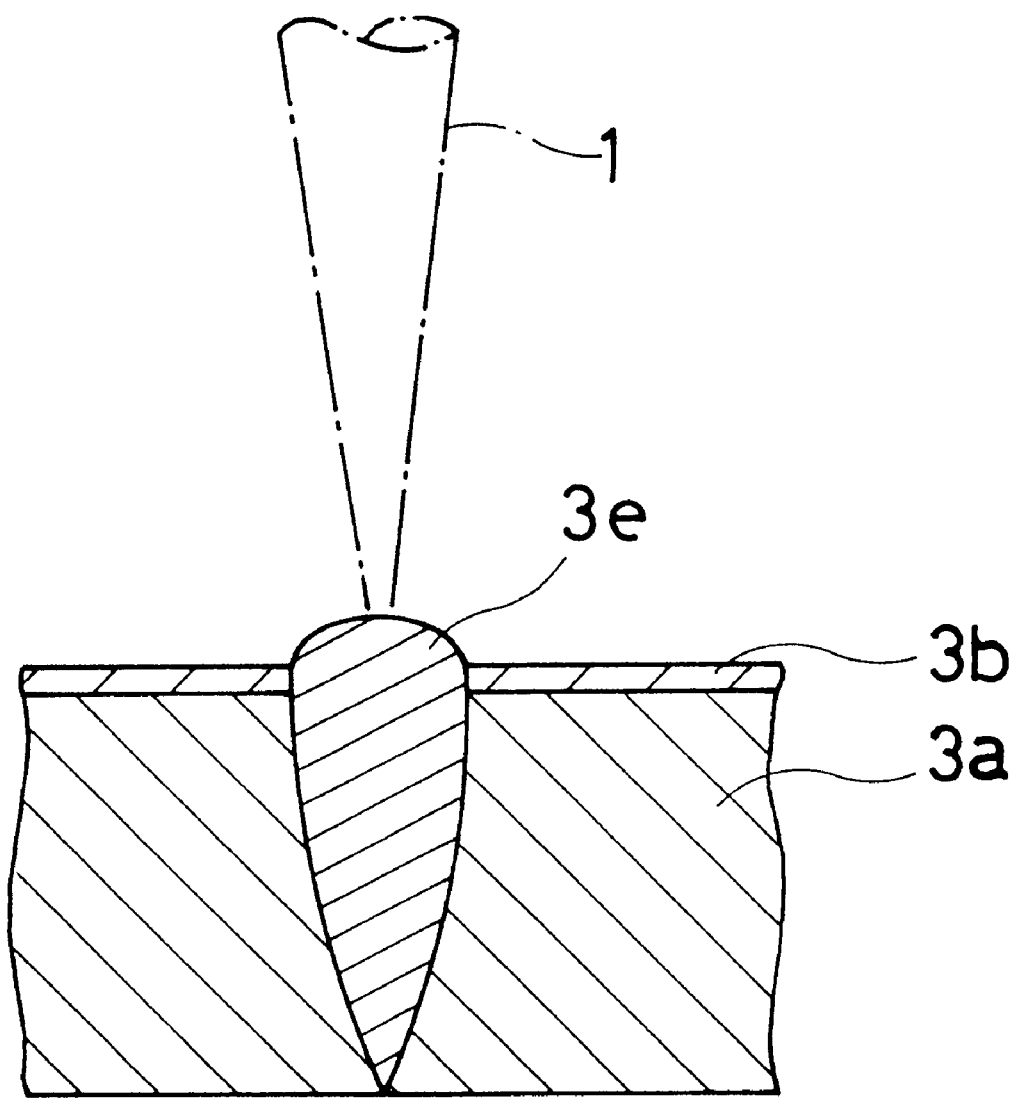
FIG. 7 is a cross sectional view showing a welding bead obtained in a welding work after removing a galvanized layer by use of a second embodiment of the inventive laser beam machining method and device.

FIG. 7 is a cross sectional view showing a welding bead obtained in a welding work after removing a galvanized layer by use of a second embodiment of the laser beam machining method and device of the invention. An overall structure of a laser beam machine in this embodiment is the same as in the first embodiment shown in the schematic view of FIG. 5, and its description is omitted.

The second embodiment is concerned with a laser be am welding while the first embodiment is concerned with a laser beam cutting. A similar device to that of the first embodiment is used to carry out the method of this embodiment, although a machining program is properly changed for a desired welding work.

The second embodiment has a preliminary machining step as a first stage, and the preliminary machining step is same as that of the first embodiment, and its detailed description is eliminated to avoid redundancy. Then, in a main machining step as a second stage, the laser beam 1 is irradiated onto a bare surface of the workpiece 3a, which is obtained by removing the galvanized layer 3b in the preliminary machining step, or a bead 3e provided in the workpiece 3a to weld it. At this time, an energy density is changed according to the main machining condition for the laser beam welding.

In the present embodiment, SECC of a plate thickness of 2 mm and a galvanizing amount of 50 g/m$^2$ is selected as a workpiece 3a. For the work of removing the coating, a condition is selected from the expression (2) so that a machining width of 5 mm and a speed of 2000 mm/min are possible. For the welding work, a machining condition is set to include an output power of 1200 W and a machining speed of 2500 mm/min, while argon (Ar) is used as an assist gas and its gas flow rate is set in 20 l/min.

In the present embodiment, blowholes were not produced in the welding bead 3e.

Figure 8:
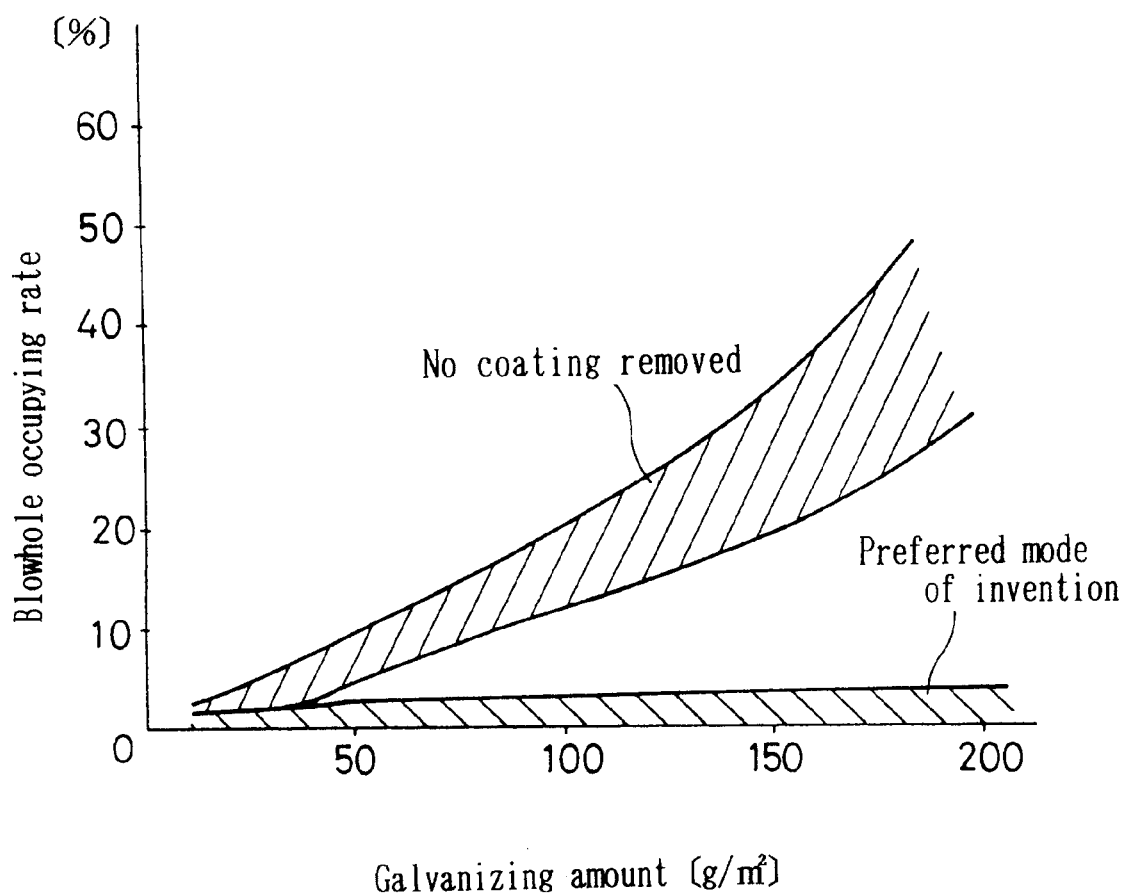
FIG. 8 is an explanatory drawing showing a graph of a blowhole occupying rate to a galvanizing amount as a parameter, while comparing values for the second embodiment of the inventive laser beam machining method and device to values in an art which has no coating removed.

FIG. 8 is an explanatory drawing showing a blowhole occupying rate [%] to a galvanizing amount [g/m$^2$] as a parameter. FIG. 8 shows results when a welding work was performed on a bead on a galvanized iron sheet as a plate 3 mm thick by the laser beam 1 with an output power of 1800 W and a speed of 1500 mm/min. The blowhole occupying rate is a proportion of cross sectional area of blowholes to a cross sectional area of the bead 3e. Data obtained in welding the work from over the galvanized layer is referred to as "related art", and data obtained in welding the work after removing the galvanized layer is referred to as "preferred mode of invention" or the present embodiment. For the work of removing the coating in the embodiment, a condition was selected from the expression (2) so that a machining width of 5 mm and a speed of 2000 mm/min were possible.

With the method and the device of the present embodiment, the quality of the welded workpiece 3a is very good and satisfactory.

Moreover, in the welding work after having removed the galvanized layer 3b in the present embodiment, the generation of blowholes decreases to a great degree, and good welding is assured. As in the first embodiment, while the present embodiment is described with respect to galvanized coating, the invention is applicable to any coating materials and the same advantageous effects are obtained, if it has a lower melting point than that of a base metal.

Also in the present embodiment, energy density for removing the coating materials is stored in a memory of the microprocessor, which constitutes the inventive laser beam machining device, in the form of the above expressions (3) to (6), according to the plating amount and a property of the coating material. Moreover, the output power can be set into a desired one from the expression (1) in accordance with a required machining width and a machining speed. FIG. 4 is a flowchart applicable to the machining process of this embodiment. This process may be automatically executed by a variety of coded commands in the machining program.

THIRD EMBODIMENT

Figure 9:
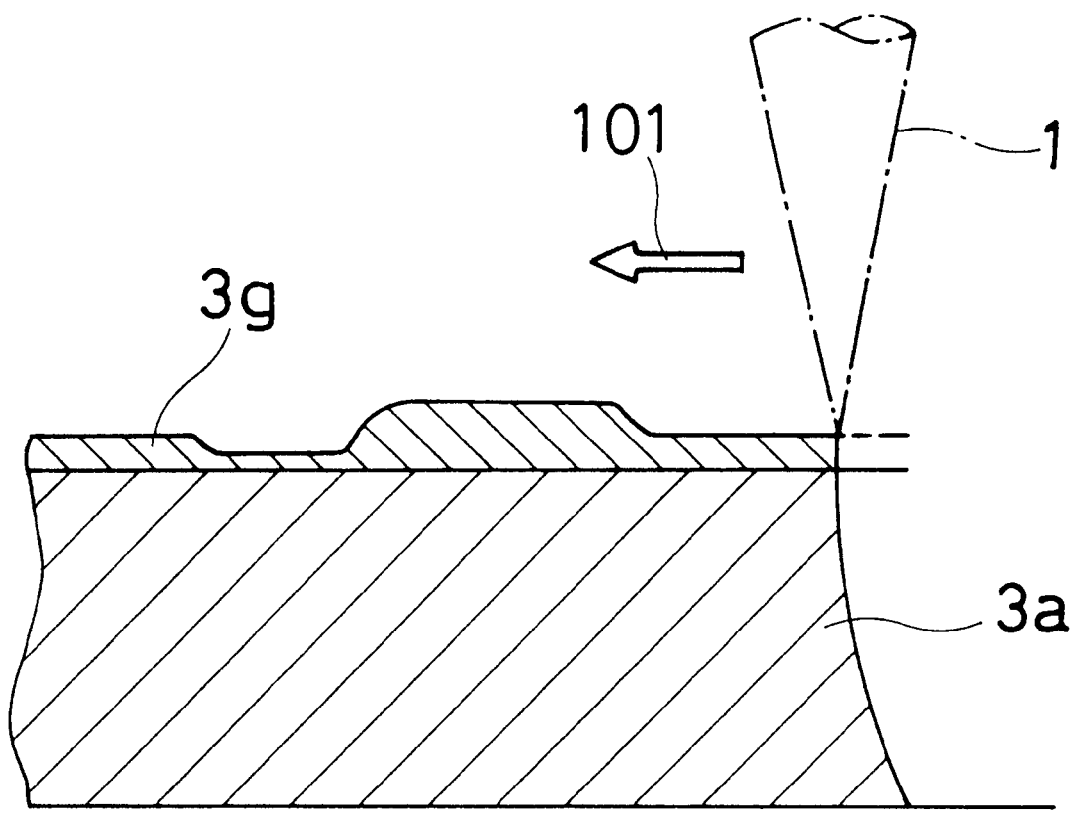
FIG. 9 is a cross sectional view showing a cut work that has a nonuniform oxide film thereon that is to be treated by a third embodiment of the inventive laser beam machining method and device.

FIG. 9 is a cross sectional view showing a cut workpiece that has a nonuniform oxide film called a mill scale thereon that is to be treated by a third embodiment of laser beam machining method and device of the invention. An overall structure of a laser beam machine in this embodiment is the same as the first embodiment shown in the schematic view of FIG. 5, and its description is omitted.

The third embodiment is concerned with a laser beam cutting as the first embodiment, while it treats a workpiece 3a having an oxide film 3g or the mill scale that is formed in rolling on its surface. A similar device to that of the first embodiment is used to carry out the method of this embodiment, too, though a machining program is properly changed for a desired mill scale removing work.

The third embodiment uses a preliminary machining step as a first stage for treating the mill scale, though the preliminary machining step is similar to that of the first embodiment except it deals with the mill scale. Namely, the oxide film 3g is removed beforehand in the preliminary step for the following main step, in the same manner as removes the galvanized layer in the first embodiment. Then, in a main machining step as a second stage, the laser beam 1 is irradiated onto a clear surface of the workpiece 3a, which is obtained by removing the mill scale in the preliminary machining step, to cut it. The main machining step is same as that of the first embodiment, and its detailed description is eliminated to avoid redundancy.

Referring to FIG. 9, a thickness of the oxide film 3g on the workpiece 3a has an influence on a absorption factor of the laser beam 1. Generally, even when the thickness of the oxide film 1 is uneven, it is impossible to machine the workpiece 3a while recognizing such a dispersion in thickness and controlling a machining condition according thereto. Namely, even in such a case, the cutting or welding workpiece is performed under the same machining condition, so that quality of machined workpiece is ununiform according to the absorption factor of the laser beam 1. Even in case of machining a work that has a thick uniform oxide film formed thereon, the oxide film is frequently peeled off in machining, so that quality of machined workpiece becomes nonuniform and deteriorated. Moreover, in machining a workpiece with rust formed thereon, there also arises nonuniformity on the machined work.

Figure 10:
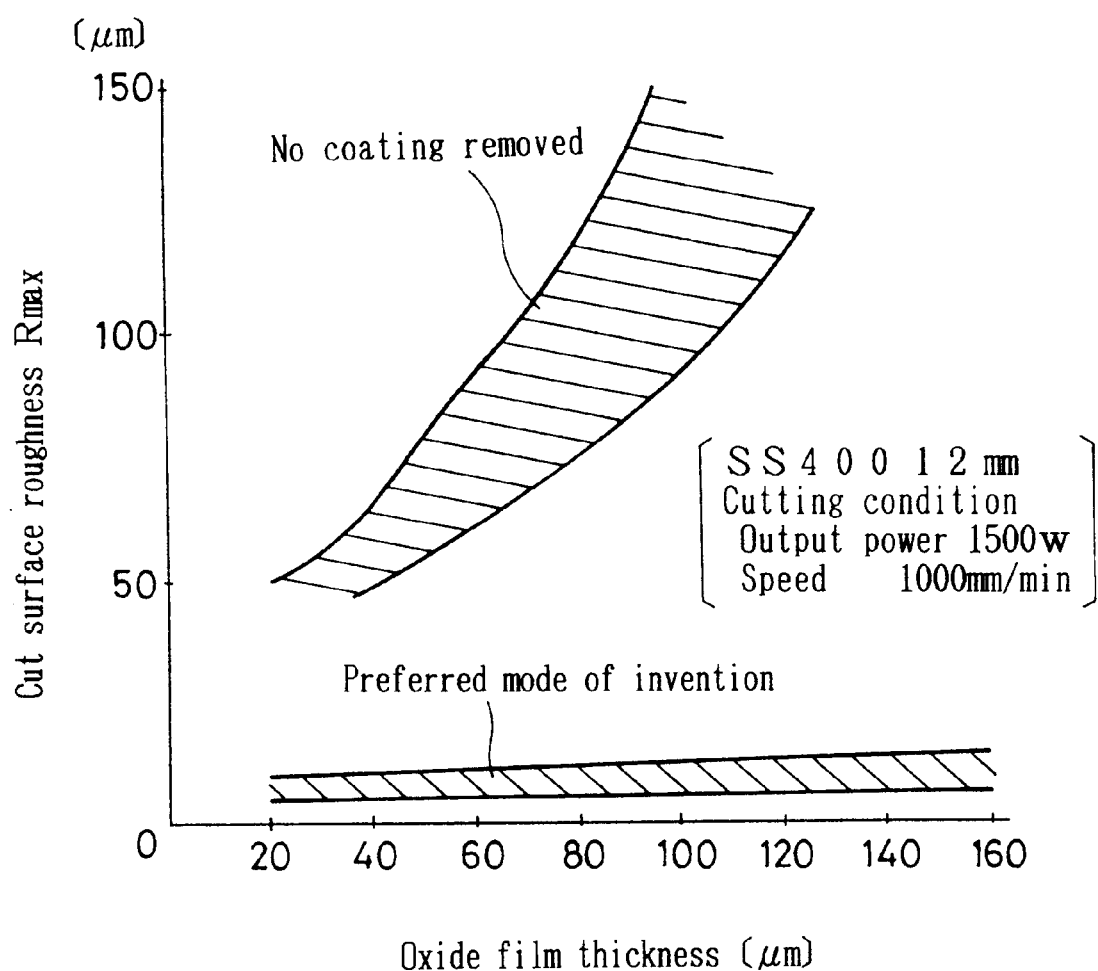
FIG. 10 is an explanatory drawing showing a relation of a thickness of oxide film and a cut surface roughness Rmax after machining, while comparing values for the third embodiment of the inventive laser beam machining method and device to values in an art which has no coating removed.

FIG. 10 is an explanatory drawing showing a relation of a thickness of oxide film [$\mu m$] and a cut surface roughness Rmax[$\mu m$] after machining with respect to a soft steel material (SS400) 12 mm thick. Here, data obtained in cutting the work without removing the oxide film is referred to as "related art", and data obtained in cutting the work after having removed the oxide film is referred to as "preferred mode of invention" or the present embodiment. A cutting condition was set to have an output power of 1500 W and a cutting speed of 1000 mm/min, and the workpiece was cut under the same condition in the related art and the present embodiment.

Generally, the thicker the oxide film is, the larger the absorption factor of the laser beam 1 and the coarser is the cut surface. However, the present embodiment has advantageous results in that the absorption factor of the laser beam 1 is uniform and the quality of the cut surface is always good and satisfactory.

FOURTH EMBODIMENT

Figure 11:
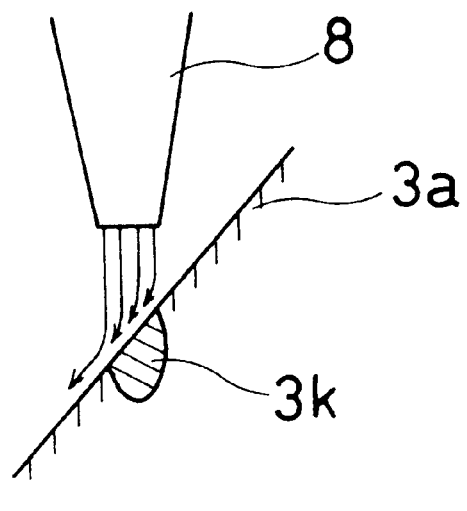
FIG. 11(a) is an explanatory drawing showing a theory of a laser machining method and a device in a related art for a case of cutting an inclined work.
FIG. 11(b) is an explanatory drawing showing a theory of a fourth embodiment of the inventive laser machining method and device for a case of cutting an inclined work.
Figure 11:
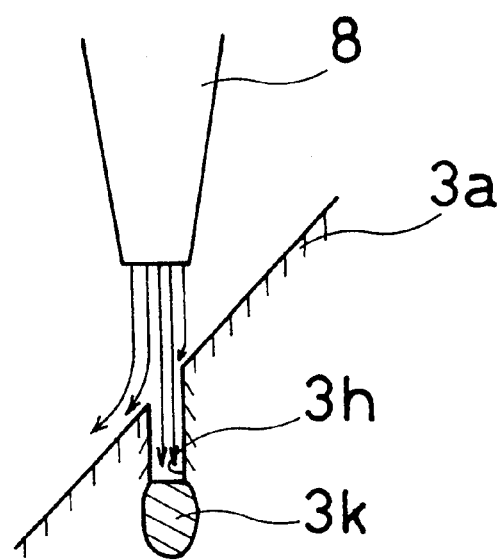

FIG. 11(b) is an explanatory drawing showing a theory of a fourth embodiment of laser machining method and device of the invention in cutting an inclined work. FIG. 11(a) is an explanatory drawing showing a theory of related art laser machining method and device in cutting an inclined work. In FIG. 11(a), arrows show gas flow when injecting an assist gas from a nozzle 8 to a workpiece 3a with a cutting groove 3h formed thereon. In FIG. 11(a), arrows show gas flow when injecting an assist gas from a nozzle 8 onto a work without any cutting groove formed thereon. An overall structure of a laser beam machine in this embodiment is the same as the first embodiment shown in the schematic view of FIG. 5, and its description is omitted.

The fourth embodiment is concerned with a laser beam cutting as the first embodiment, while it pretreats a workpiece 3a to form a cut groove. A similar device to that of the first embodiment is used to carry out the method of this embodiment, although a machining program is properly changed for a desired cut groove forming work and a after cutting work.

The fourth embodiment uses a preliminary machining step as a first stage for pretreating the workpiece 3a to form the cut groove 3h, instead of removing work of the galvanized layer along a predetermined locus in the first embodiment. Namely, the cut groove 3h is formed beforehand in the preliminary step for the following main step. Then, in a main machining step as a second stage, the laser beam 1 is irradiated onto the cut groove of the workpiece 3a to cut it while an assist gas is also injected onto the cut groove, too.

As mentioned above, the fourth embodiment is to treat the inclined workpiece 3a for improving its cutting. Namely, in related art of FIG. 11(a), direction of the gas flow is fixed and inclined along the plane of the inclined workpiece 3a, so that any momentum cannot be expected to press down a melted part 3k, which is melted by irradiation of the laser beam 1. To the contrary, in this embodiment of FIG. 11(b), since the cutting is performed after a cut groove 3h has been formed on the surface of the workpiece 3a, the cut groove 3h serves as a nozzle to orient the flow of the assist gas and functions to press down the melted part 3k of the workpiece 3a, thereby improving cutting capability to a great degree.

Figure 12:
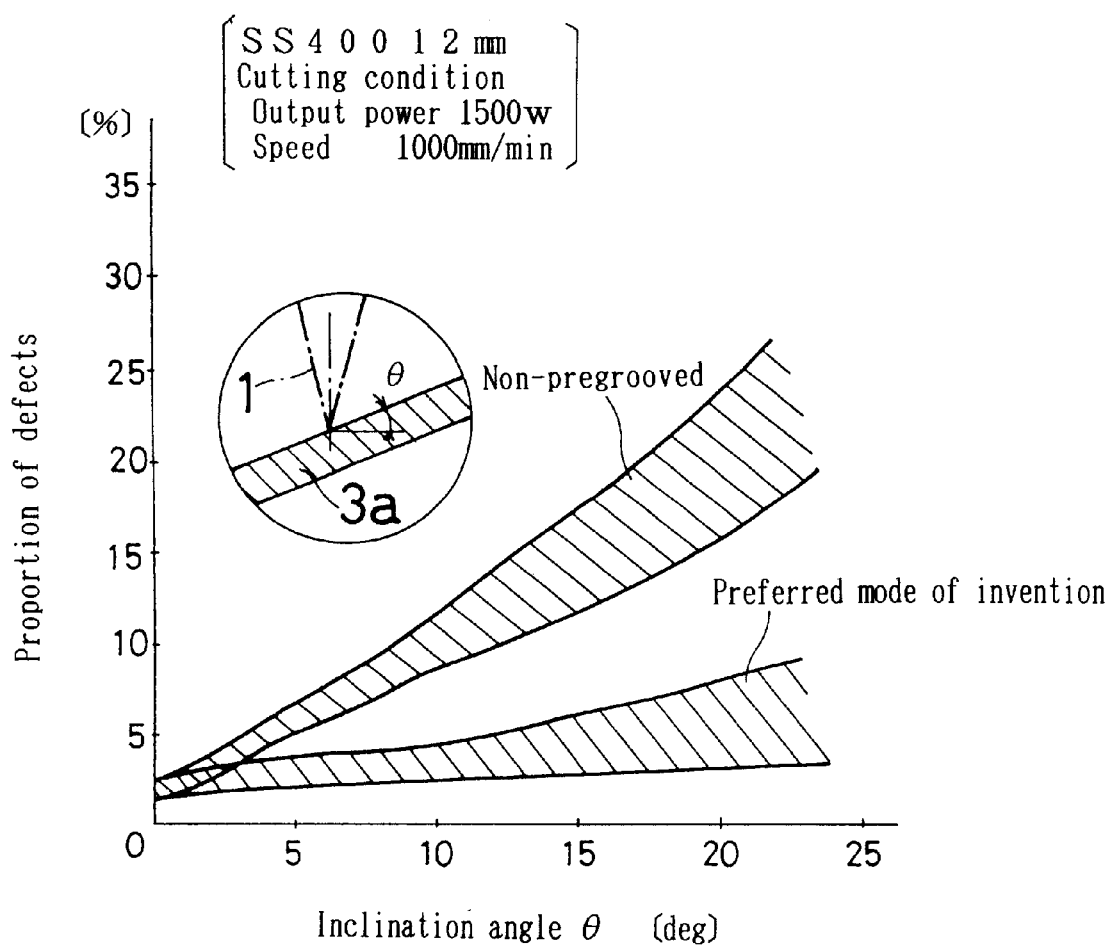
FIG. 12 is an explanatory drawing showing a relation of an inclination angle relative to a horizontal direction and a proportion of defects, while comparing a value in the fourth embodiment of the inventive laser beam machining method and device with a value in an art which has no groove prepared.

FIG. 12 is an explanatory drawing showing a relation of an inclination angle θ [deg] relative to a horizontal direction and a proportion defective [%] in cutting a soft steel material (SS400) 12 mm thick. Here, data obtained in cutting the work without the cut groove 3h is referred to as "related art", and data obtained in cutting the work after formed the cut groove 3h is referred to as "preferred mode of invention" or the present embodiment. A cutting condition was set at an output power of 1500 W and a cutting speed of 1000 mm/min, and the work was cut under the same condition in the related art and the present embodiment.

The larger the inclination angle is, the more different the proportion of defects in the present embodiment and the related art. Namely, the present embodiment improves the proportion of defects in machining the inclined workpiece 3a to a great degree.

With the method and the device of the present embodiment, the quality of the cut workpiece 3a is very good and satisfactory.

While the present embodiment shows the machining work while inclining the workpiece 3a, the same advantageous effects can be obtained in case of inclining the laser beam direction relative to the work surface.

FIFTH EMBODIMENT

In a fifth embodiment, in a preliminary machining step as a first stage, the laser beam 1 is condensed into a high energy density and is irradiated onto a final machining locus that is same as a main machining locus, thereby oxidizing beforehand the surface of the workpiece 3a. The preliminary step is carried out under a preliminary machining condition of an assist gas containing oxygen gas for oxidizing the surface of the workpiece 3a, which is different from a main machining condition for a cutting work. In a main machining step as a second stage, the laser beam 1 is irradiated onto the pretreated surface of the workpiece 3a to cut it, in an energy density that is changed according to the maim machining condition for the laser beam cutting.

Figure 13:
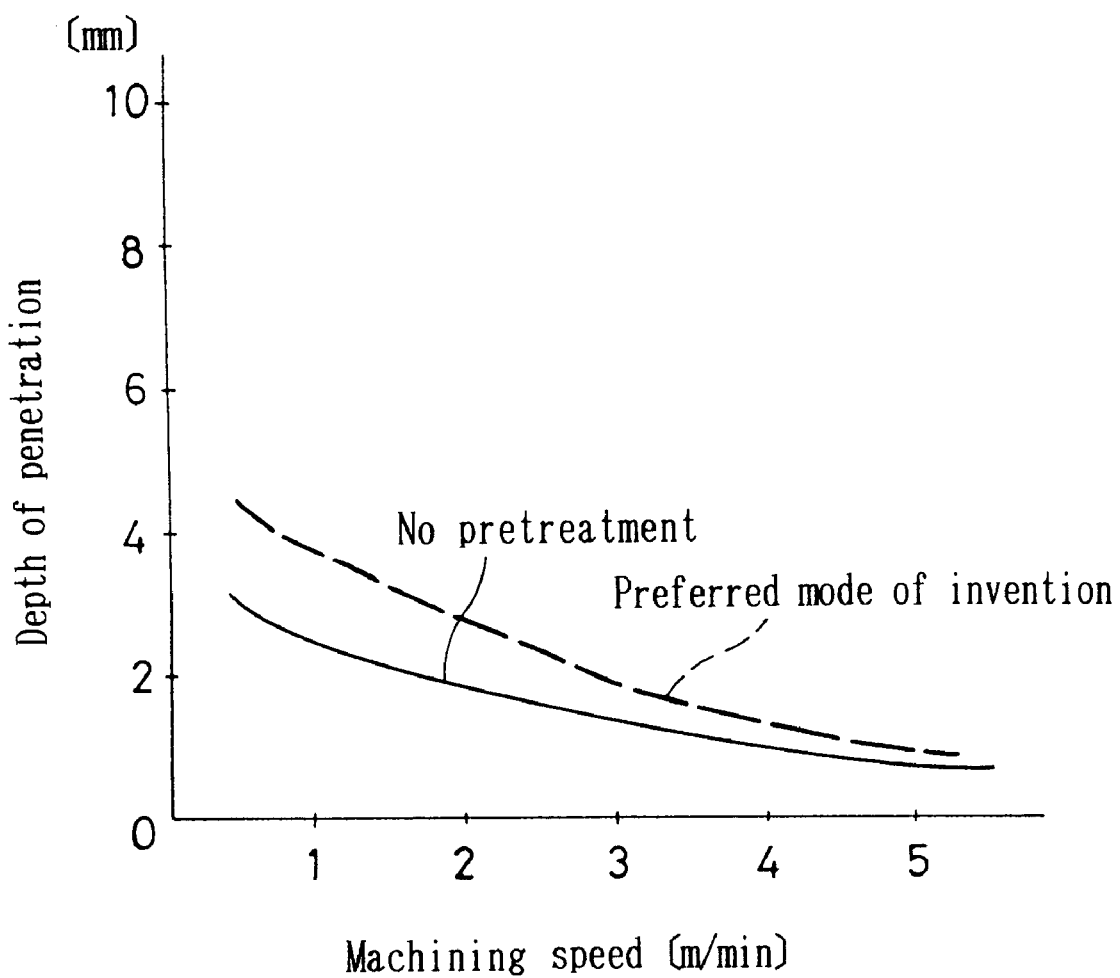
FIG. 13 is an explanatory drawing showing a relation of a machining speed and a depth of penetration in welding after a surface of a material is oxidized under a condition that uses beforehand either pure oxygen or a mixed gas containing an oxygen, while comparing a value in a fifth embodiment of the inventive laser beam machining method and device with an art which has no pretreatment.

FIG. 13 is an explanatory drawing showing a relation of a machining speed [m/min] and a depth of penetration[mm] in welding an aluminum alloy (A5052), while comparing a fifth embodiment of laser beam machining method and device of the invention with related art. An overall structure of a laser beam machine in this embodiment is the same as the first embodiment shown in the schematic view of FIG. 5, and its description is omitted. The fifth embodiment carries out the welding after oxidizing beforehand a surface of the ally using oxygen or a mixed gas containing oxygen, while the related art has no such pretreatment. For the oxidizing work, a machining condition is set to have an output power of 2000 W and a machining speed of 3000 mm/min, while oxygen ($O_2$) is used as an assist gas and its gas pressure is set in 2 kg/cm². For the welding work, a machining condition is set to an output power of 4000 W, while argon (Ar) is used as an assist gas and its gas flow rate is set in 20 l/min. When the surface of the aluminum alloy is not oxidized, the absorption factor of the laser beam 1 is not more than 5%. If oxidized, the absorption factor becomes twice or three times. This means that a welding capability increases to a great degree by oxidizing the surface of the work in the present embodiment.

With the method and the device of the present embodiment, the quality of the welded workpiece 3a is very good and satisfactory.

While the present embodiment treats the aluminum alloy, it may be applicable to any other materials of high reflectivity such as an aluminum, a copper, a copper alloy, etc. and can improve the quality, too.

SIXTH EMBODIMENT

Figure 14:
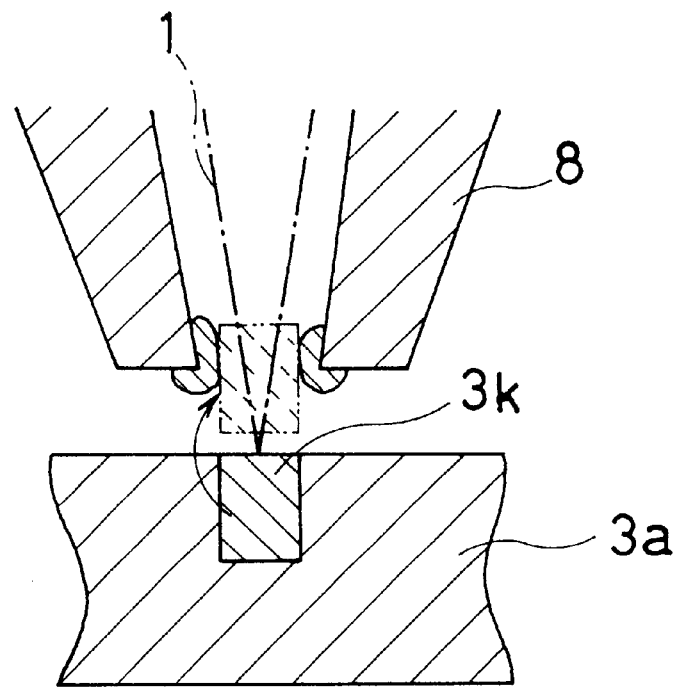
FIG. 14 is an explanatory drawing showing a grooving state when irradiating a laser beam and injecting an assist gas vertically onto a surface of a work, in a related art.
Figure 15:
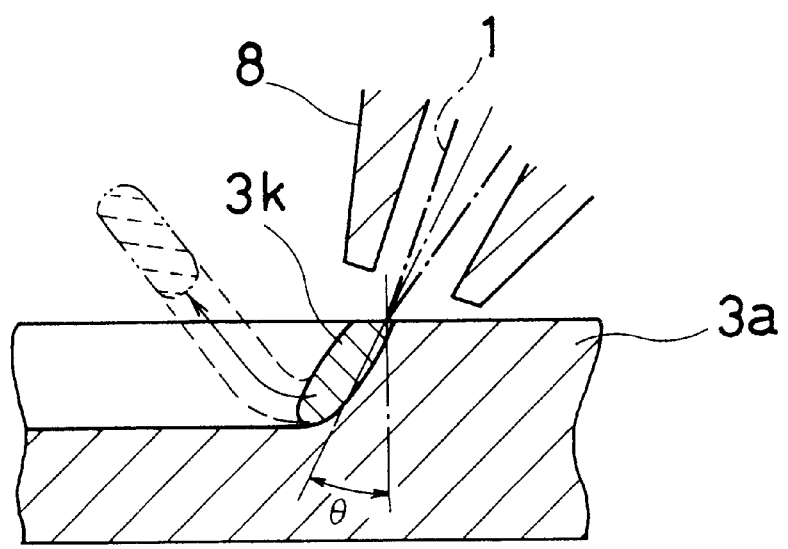
FIG. 15 is an explanatory drawing showing a groove made by an inclined nozzle in a sixth embodiment of the inventive laser beam machining and device.

FIG. 15 is an explanatory drawing showing a grooving work by an inclined nozzle in a sixth embodiment of the laser beam machining method and device of the invention. FIG. 14 is an explanatory drawing showing a grooving state when irradiating the laser beam 1 and injecting an assist gas vertically onto a surface of a workpiece 3a, in a double cutting technique of related art. An overall structure of a laser beam machine in this embodiment is the same as the first embodiment shown in the schematic view of FIG. 5, and its description is omitted.

In laser cutting, a melted part 3k is blown upwards by the laser beam irradiation and the assist gas injection, so that the melted metal adheres to the nozzle 8. As a result, the flow of assist gas is disturbed and defective machining is caused. Therefore, the laser beam machining of the related art ejects the melted metal from a lower part of the work, thereby continuing stable machining.

To the contrary, in the present embodiment, as shown in FIG. 15, the nozzle 8 is inclined to the workpiece 3a so asto eject the blown up metal in such a direction as not to adhere to the nozzle 8. In the present embodiment, while the nozzle 8 is inclined relative to the laser beam 1 so that the melted part 3k does not adhere to the nozzle 8 in ejecting the melted part 3k while performing the grooving work, a structure may be used in which a second nozzle is provided at the side of the nozzle 8 to inject gas onto the nozzle 8 in order to blow off and eject the melted part 3k.

Figure 16:
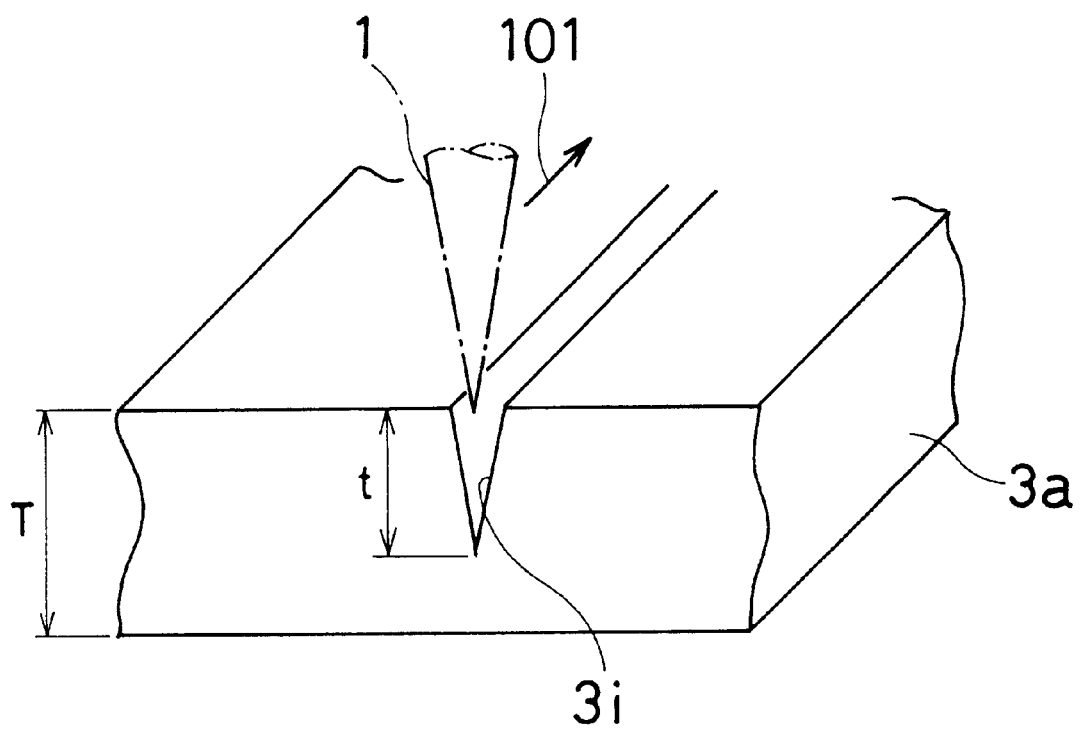
FIG. 16 is an explanatory drawing showing a machining state in which a groove is formed beforehand on a work along a cutting locus and in which the work is cut thereafter, in cutting a thick plate by use of the sixth embodiment of the inventive laser beam machining method and device.

FIG. 16 is an explanatory drawing showing a machining state in which a groove is formed beforehand on a work along a cutting locus and the work is cut thereafter, in cutting a thick plate by use of the present embodiment of a laser beam machining method and device.

In this case, a plate thickness of the workpiece 3a is T, and a grooving depth is t, so that an actual cutting thickness is (T−t), thereby facilitating a stable cutting work.

In FIG. 16, the reference numeral 3i shows a groove machined by laser before cutting the workpiece 3a. In machining the groove 3i, it is necessary to repeat grooving works of short distance to prepare the whole groove 3f, or to set the machining gas pressure higher than that of the cutting condition and blow off the melted substance at high speed, or to irradiate the laser beam 1 and inject the assist gas in such a direction as the melted substance from the work surface does not directly adhere to the nozzle, thereby preventing the melted substance from adhering to the nozzle in the grooving work.

Figure 17:
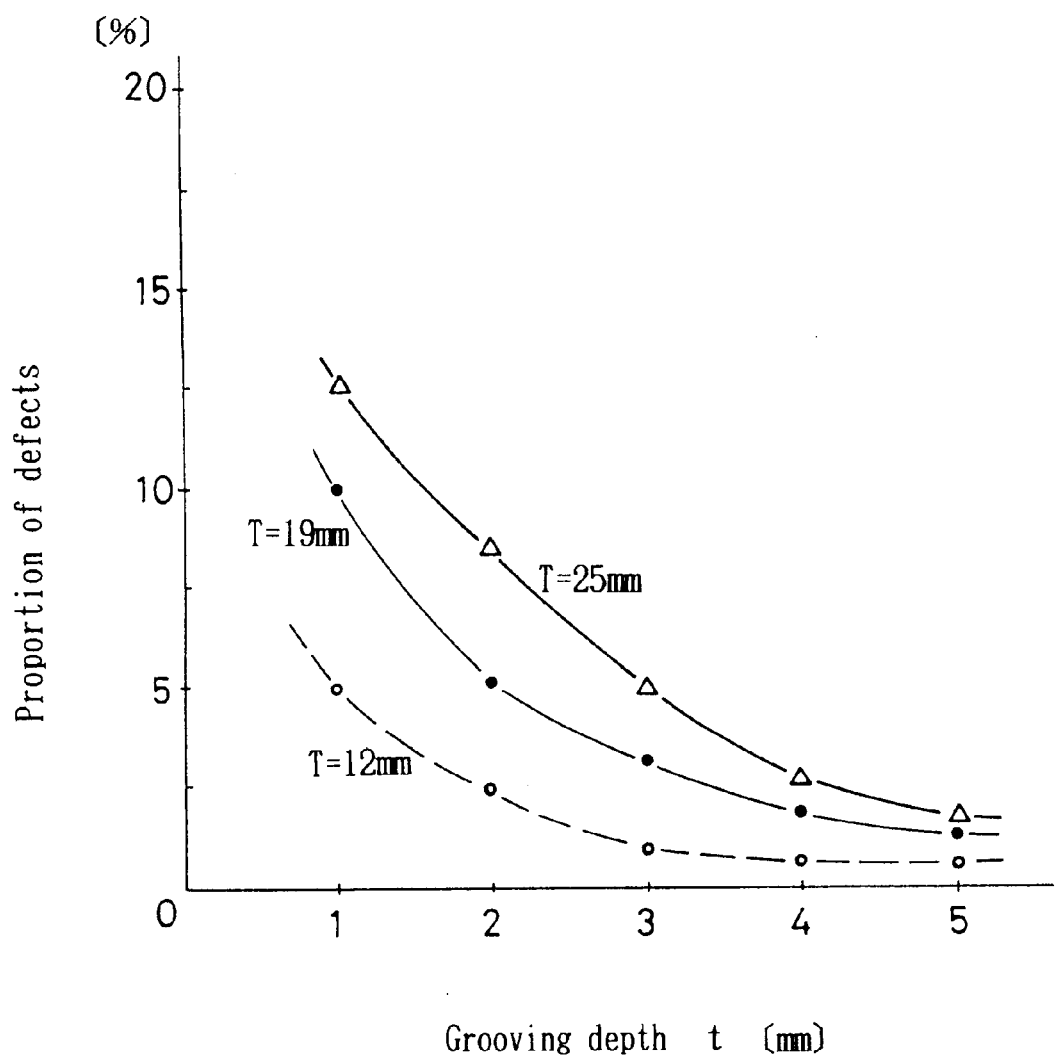
FIG. 17 is an explanatory drawing showing a relation of a grooving depth t and a proportion defective, in cutting soft steel materials of different thicknesses T by use of the sixth embodiment of the inventive laser beam machining method and device.

FIG. 17 is an explanatory drawing showing a relation of a grooving depth [mm] and a proportion of defects [%], in cutting soft steel materials of different thicknesses (T=12 mm, T=19 mm and T=25 mm).

The smaller the thickness is, the lower the proportion defective is. However, in each thickness of the material, the larger the grooving depth t is, the lower the proportion defective is since the assist gas becomes stable. Every works were done while the nozzle having an inclination angle θ=30 in the grooving work. A machining condition in the grooving work is set as follows under a pulse condition: an output power of 1000 W, a machining speed of 1.5 m/min and a gas pressure of 3 kg/cm² when the grooving depth t is 2 mm; an output power of 1500 W, a machining speed of 1.2 m/min and a gas pressure of 3 kg/cm² when the grooving depth t is 3 mm; an output power of 2000 W, a machining speed of 1.0 m/min and a gas pressure of 3 kg/cm² when the grooving depth t is 4 mm; an output power of 2200 W, a machining speed of 1.0 m/min and a gas pressure of 3 kg/cm² when the grooving depth t is 4 mm; an output power of 2400 W, a machining speed of 0.8 m/min and a gas pressure of 3 kg/cm² when the grooving depth t is 5 mm.

As mentioned above, the sixth embodiment has the same first and second steps as the first embodiment, and inclines the directions of the laser beam irradiation and the assist gas injection relative to a machined surface of the workpiece 3a in the preliminary machining step. In the main machining step, the directions of the laser beam irradiation and the assist gas injection are set perpendicular relative to the machined surface of the workpiece 3a.

With the method and the device of the present embodiment, the quality of the cut workpiece 3a is very good and satisfactory.

SEVENTH EMBODIMENT

Figure 18:
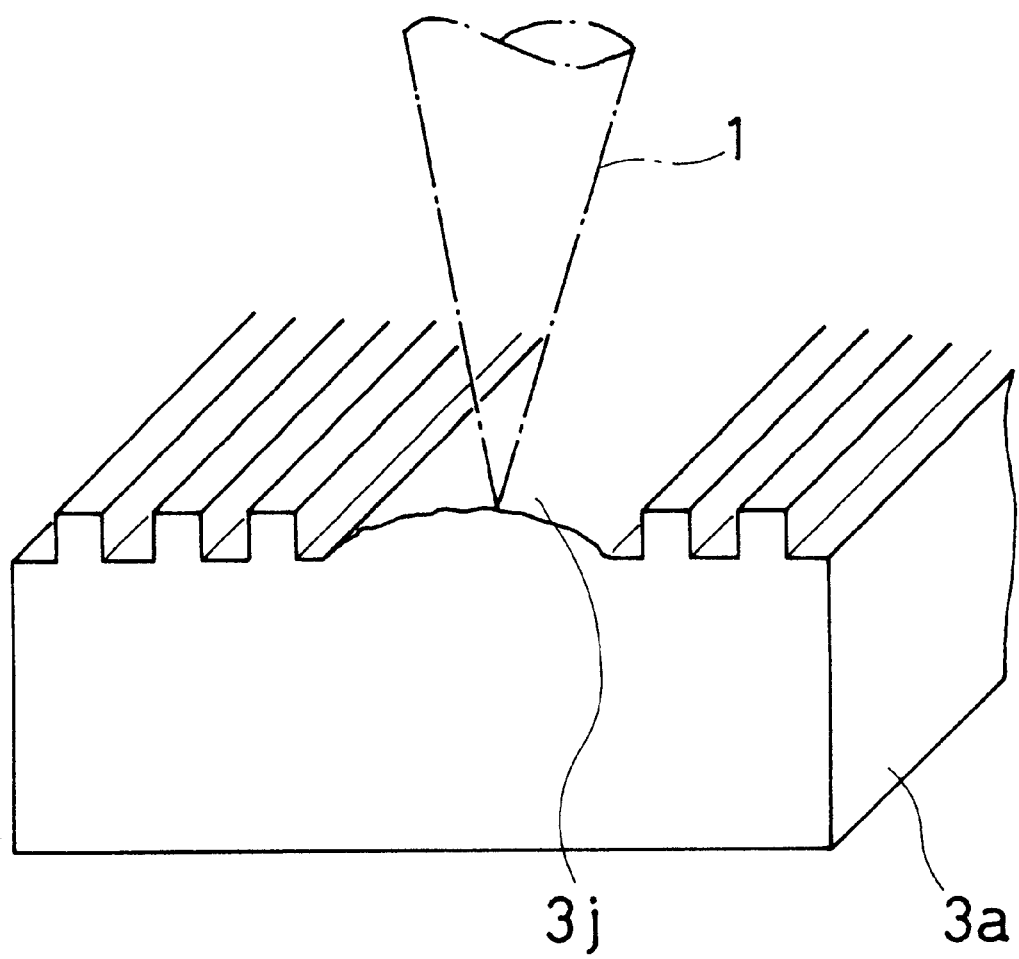
FIG. 18 is an explanatory drawing showing a machining state in a cutting work in which a cutting locus of a work is melted to reform its cut surface roughness and the work is cut thereafter, in cutting the work with the surface finished with low accuracy by mechanical machining or the like, by use of a seventh embodiment of the inventive laser beam machining method and device.

FIG. 18 is an explanatory drawing showing a machining state in a cutting work in which a cutting locus of a work is melted to reform its cut surface roughness and the work is cut thereafter, in cutting the work with the surface finished with low accuracy by mechanical machining or the like, by use of a seventh embodiment of laser beam machining method and device of the invention. An overall structure of a laser beam machine in this embodiment is the same as the first embodiment shown in the schematic view of FIG. 5, and its description is omitted.

FIG. 18 shows a melted surface 3j before cutting. In machining the melted surface 3j, it is necessary to use a low output power condition, to set a focus position into a defocused one, or to use such a gas as restrains oxidation as an assist gas.

Figure 19:
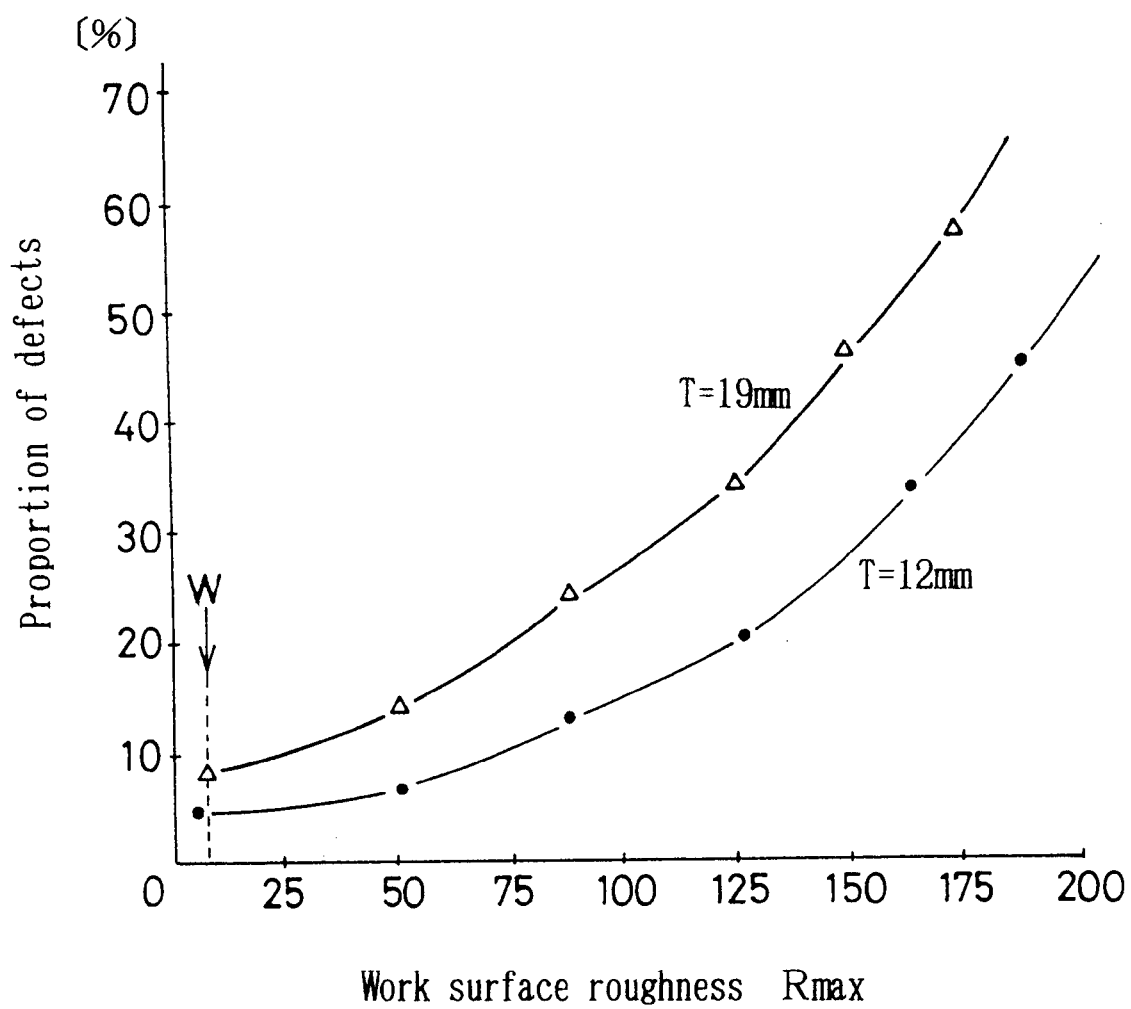
FIG. 19 is an explanatory drawing showing a relation of a work surface roughness Rmax and a proportion of defects in cutting soft steel materials of different thicknesses T in the seventh embodiment of the inventive laser beam machining method and device.

FIG. 19 is an explanatory drawing showing a relation of a work surface roughness Rmax and a proportion of defects [%] in cutting soft steel materials of different thicknesses (T=12 mm and T=19 mm).

The smaller the plate thickness is, the lower the proportion defective is, and, in each plate thickness, the larger the work surface roughness Rmax is, the more the proportion defective becomes. The surface roughness in case of melting beforehand the cutting locus to reform the cut surface roughness is about 9 μm (Rmax) as shown by W in FIG. 19. The proportion defective is about 5% regarding the thickness (T=12 mm) and about 9% regarding the thickness (T=19 mm). The condition to make the work surface roughness Rmax uniform depends on a size of the surface roughness, but good results were obtained under the following conditions.

If Rmax<50 μm, an output power was 300 W, a machining speed was 2000 mm/min, and a gas pressure was 0.1 kg/cm². If 50 μm≦Rmax≦150 μm, an output power was 450 W, a machining speed was 2000 mm/min, and a gas pressure was 0.1 kg/cm². If 150 μm≦Rmax≦300 μm, an output power was 600 W, a machining speed was 2000 mm/min, and a gas pressure was 0.1 kg/cm².

As mentioned above, the present embodiment has the same first and second steps as the first embodiment, and uses the first step to make uniform in advance the surface roughness that is nonuniform by irradiating the laser beam along the cutting locus.

With the method and the device of the present embodiment, quality of the cut workpiece 3a is very good and satisfactory.

While the present embodiment is applied to a case in which machining or pretreatment is performed in parallel with a longitudinal direction of the work surface roughness or irregularity, it may be embodied to machine or pretreat the work in a direction crossing the concaves or convexes.

EIGHTH EMBODIMENT

Figure 20A:
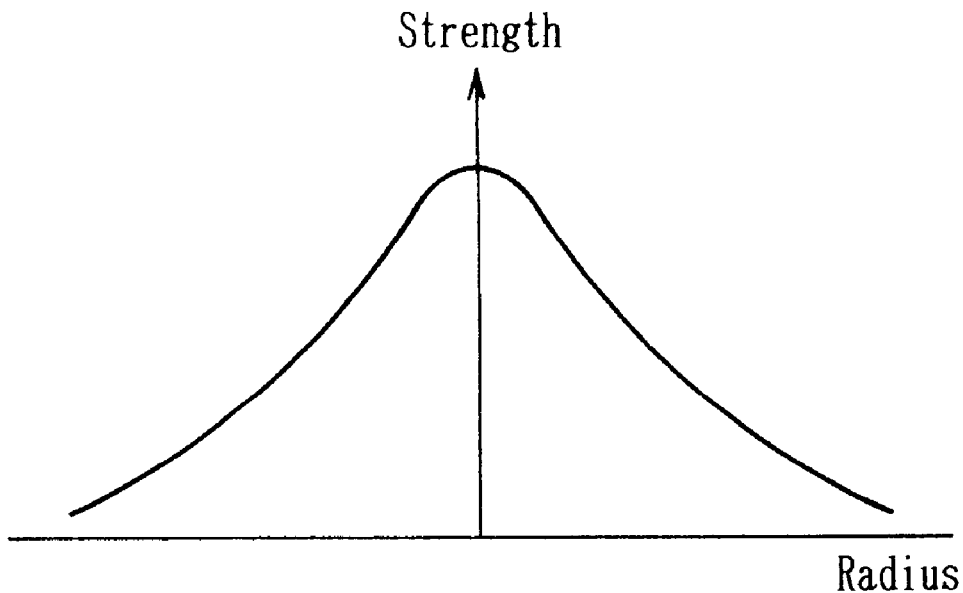
FIGS. 20(a) and 20(b) are explanatory drawings respectively showing a relation of a laser beam mode and a laser beam state according to an eighth embodiment of the inventive laser beam machining method and device.
Figure 20B:
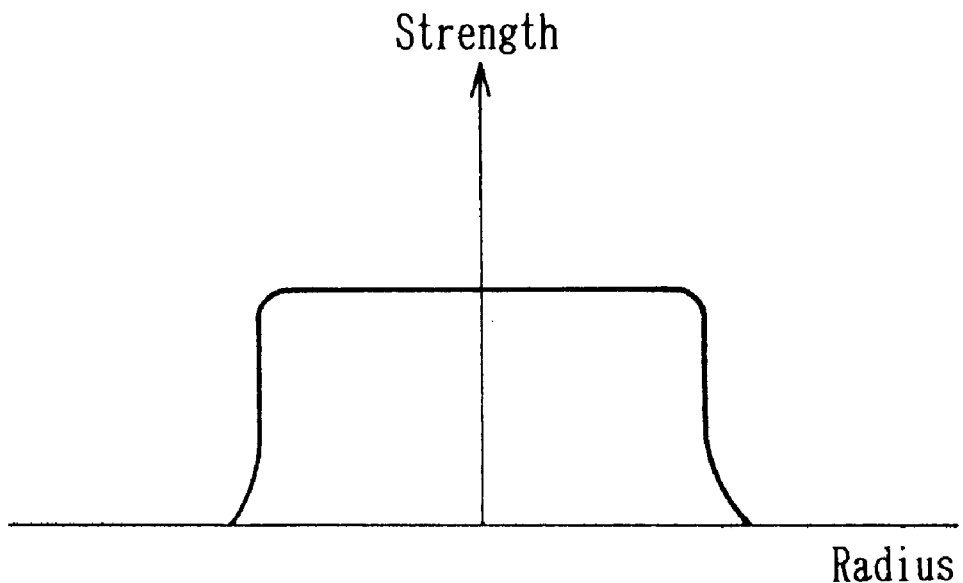
Figure 21:
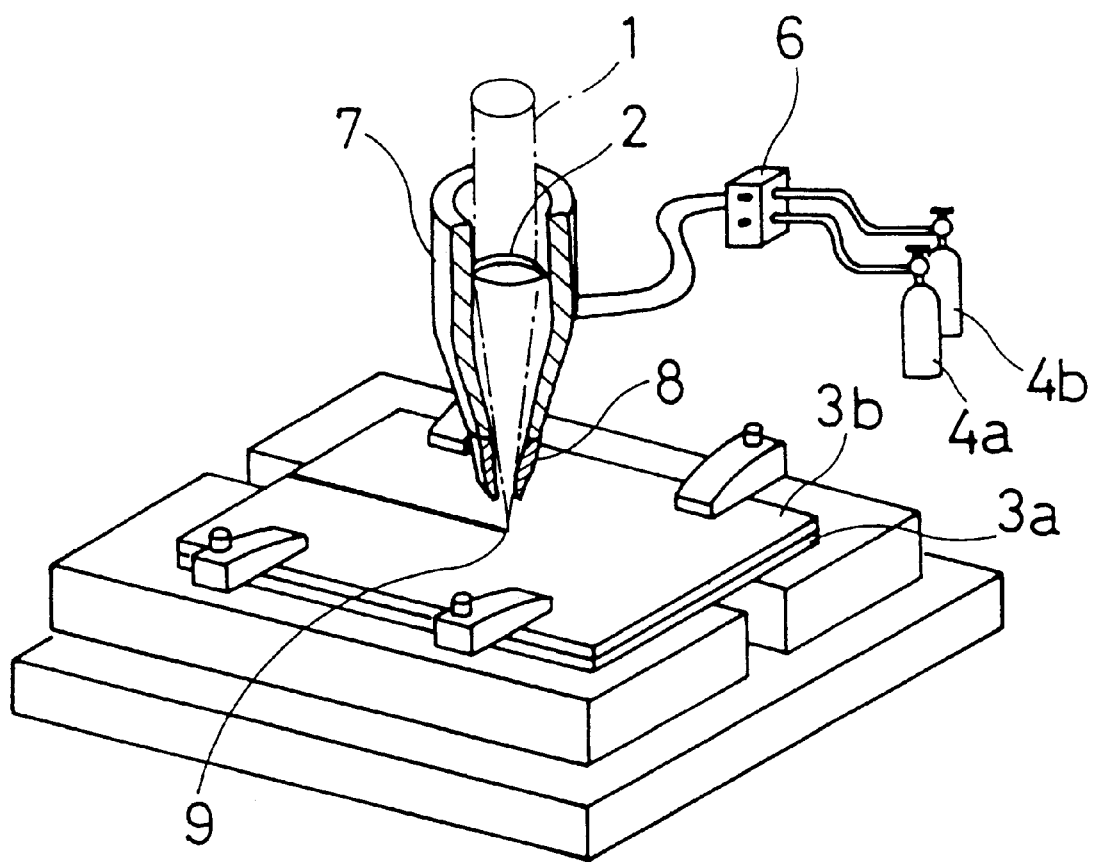
FIG. 21 is a perspective view showing a laser beam machining method and device of a conventional art.
Figure 22:
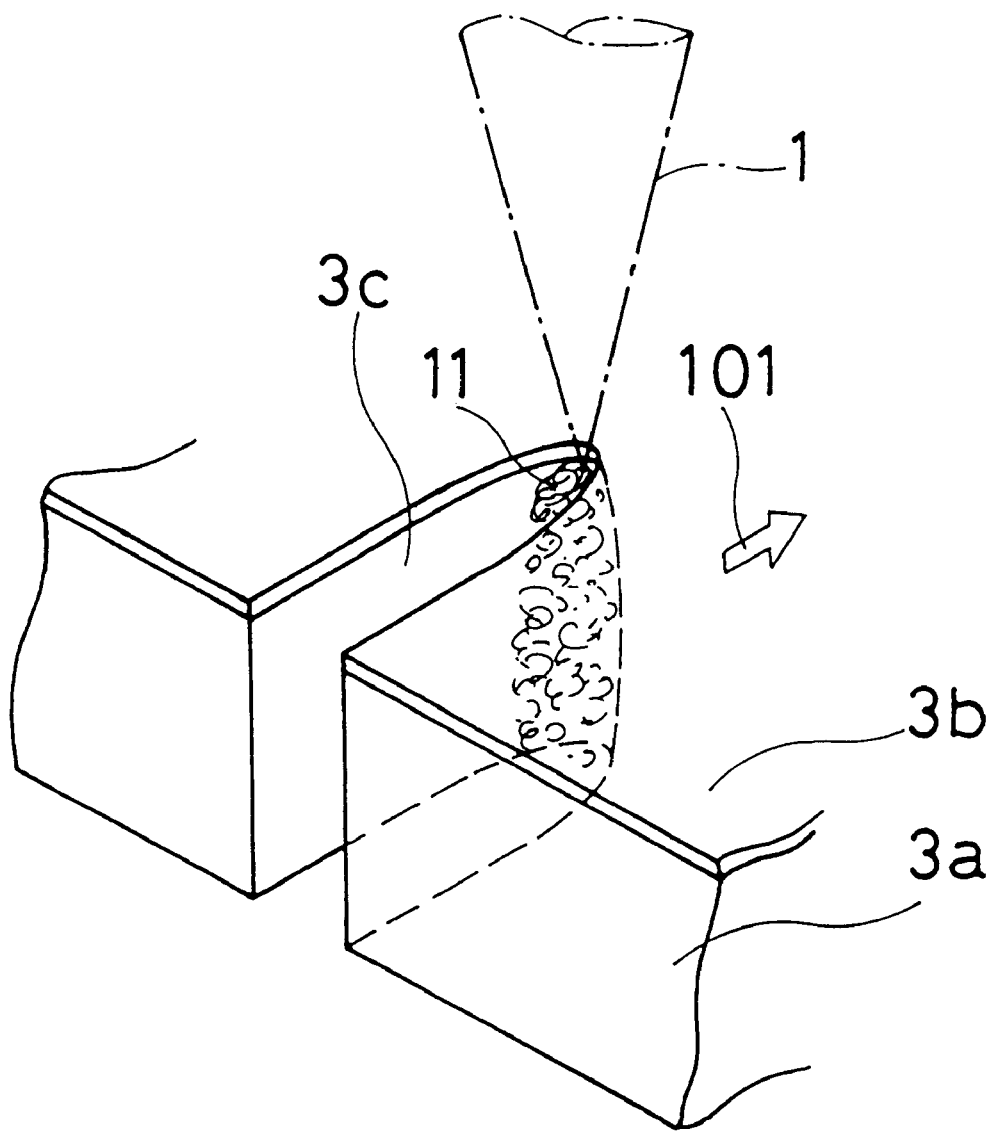
FIG. 22 is a perspective view showing a cutting work of a laser beam machining method and device of a conventional art.
Figure 23:
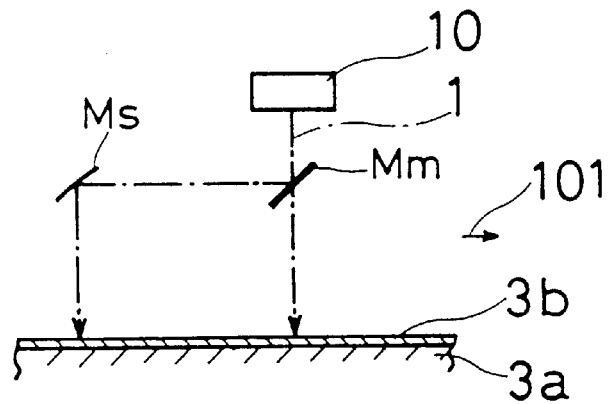
FIG. 23 is a schematic view showing another laser beam machining method and device of a conventional art.
Figure 24:
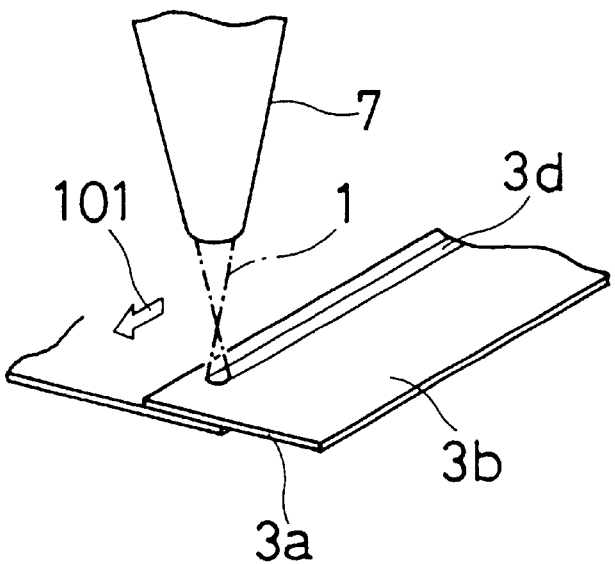
FIG. 24 is a perspective view showing a welding work as a preliminary machining in a laser beam machining method and device of a conventional art.
Figure 25:
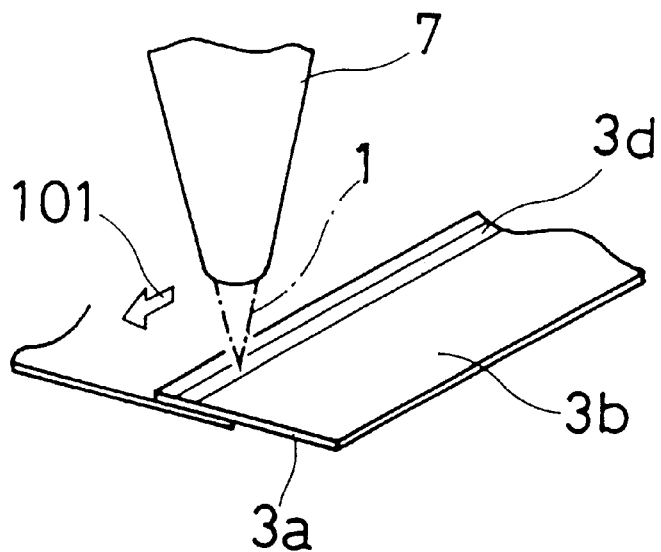
FIG. 25 is a perspective view showing a main machining in a laser beam machining method and device of a conventional art.
Figure 26:
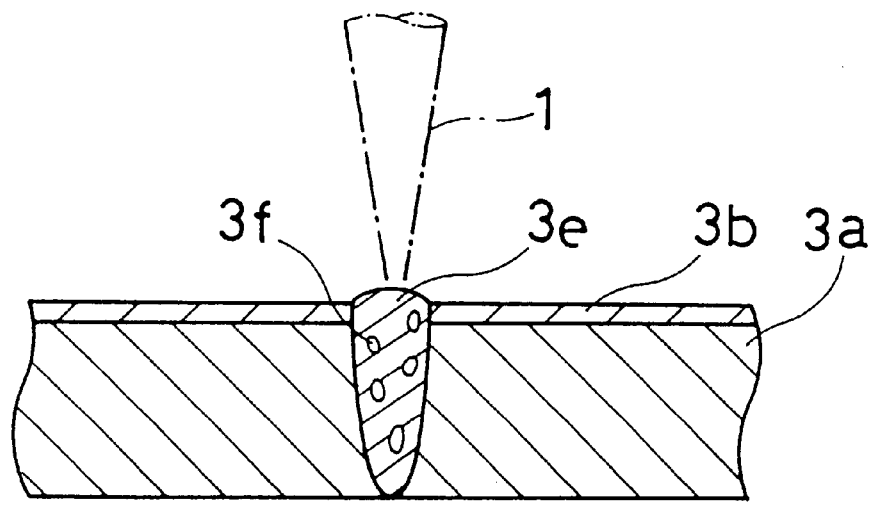
FIG. 26 is a cross sectional view showing a defective weld in a laser beam machining method and device of a conventional art.

FIGS. 20(a) and 20(b) are explanatory drawings respectively showing a relation of a laser beam mode and a laser beam state according to an eighth embodiment of laser beam machining method and device of the invention. FIG. 19(a) shows a single mode that is excellent in beam condensing performance and is most preferred. FIG. 19(b) shows a laser beam mode in which an energy density is uniform at a laser beam irradiated part.

If the laser beam 1 is defocused in the state of the energy density shown in FIG. 20(a) to remove a coating material on a work, there is sometimes caused a surface melting at a center part of the work that receives a high density beam. In view of the above, the present embodiment treats the surface of the work to remove beforehand the surface substance (coating material, oxide film or rust) in the laser beam mode of FIG. 20(b). In the main machining or the cutting work, the mode is switched from the mode of FIG. 20(b) to the single mode of FIG. 20(a).

Generally, the laser beam modes are switched according to aperture radii in a laser oscillator. Such mode change can be made automatically by information from a control device (not shown), while machining conditions are switched between the preliminary machining and the main machining.

As mentioned above, the present embodiment has the same first and second steps as the first embodiment, and irradiates the laser beam in the first step under such a machining condition as to obtain an energy density and an energy distribution that is different from at least one of machining conditions for the cutting work, welding work and thermal treatment. In the second step, the energy density and the energy distribution are changed according to at least one of the machining conditions for the cutting work, welding work and thermal treatment.

With the method and the device of the present embodiment, quality of the cut workpiece 3a is very good and satisfactory.

The preferred embodiments described herein are illustrative and not restrictive, the scope of the invention being indicated in the appended claims and all variations which come within the meaning of the claims are intended to be embraced therein.

What is claimed is:

1. A laser beam machining method comprising a preliminary machining step for pretreating a workpiece and a main machining step for machining the workpiece along a final machining locus after a predetermined time period from the preliminary machining step, wherein:

the preliminary machining step comprises condensing and focusing a laser beam into a high energy density and a first energy distribution, and irradiating a leading end of a laser beam along the final machining locus, under preliminary machining conditions so as to obtain a first energy density for removing a surface material of the workpiece;

the main machining step comprising irradiating the laser beam onto an area of the workpiece from which the surface material has been removed by said preliminary machining step, under main machining conditions so as to obtain a second energy density different from said first energy density and a second energy distribution different from said first energy distribution, for machining the workpiece; and the preliminary machining step and the main machining step use a same program storing a same machining locus, the preliminary machining step comprising setting the first energy density of the laser beam necessary for removing the surface material in accordance with an amount and a characteristic of the surface material so that the preliminary machining step is performed according to the surface material.

2. The laser beam machining method as set forth in claim 1, wherein said first energy density is lower than said second energy density.

3. A laser beam machining method as set forth in claim 1, wherein:

the surface material is a coating material made of a plating layer and having a melting point lower than a melting point of the workpiece; and the first energy density is set in accordance with a plating amount and a property of the coating material.

4. A laser beam machining method as set forth in claim 3, wherein:

the energy density (E) is represented by an expression E=P/VL, where P signifies a laser output, V signifies a machining speed and L signifies a machining width; and each of the laser output (P), the machining speed (V) and the machining width (L) is set according to a characteristic of the coating material and a characteristic of the plating material, wherein the first energy density is set at a lowest energy density among energy densities that can remove the coating material to achieve an optimal machining speed.

5. A laser beam machining method as set forth in claim 4, wherein the coating material is zinc, and the plating amount (M) and the lowest energy density (E) has a relation E=74·ln M+130.

6. A laser beam machining method as set forth in claim 4, wherein the coating material is zinc-aluminum alloy, and the plating amount (M) and the lowest energy density (E) has a relation E=80·ln M+260.

7. A laser beam machining method as set forth in claim 4, wherein the coating material is zinc-nickel alloy, and the plating amount (M) and the lowest energy density (E) has a relation E=78·ln M+241.

8. A laser beam machining method as set forth in claim 4, wherein the coating material is iron-zinc alloy, and the plating amount (M) and the lowest energy density (E) has a relation E=76·ln M+222.

9. A laser beam machining method as set forth in claim 1, wherein the surface material is an oxide film.

10. A laser beam machining method as set forth in claim 1, wherein:

the preliminary machining step comprises irradiating the laser beam in a multi-mode having a uniform energy density along the final machining locus so that a portion of the workpiece where the laser beam is irradiated is processed with the uniform first energy density and the first energy distribution which is uniform; and the main machining step comprises irradiating the laser beam in a single-mode having a higher light-condensing characteristic than the multi-mode on an area of the workpiece where the surface material has been removed so that the main machining is performed with the laser beam of the second energy density and the second energy distribution different from the first energy density and the first energy distribution.

11. A laser beam machining method as set forth in claim 1, wherein:

the surface material is one of a zinc-aluminum alloy, a zinc-nickel alloy, an iron-zinc alloy and zinc; and the first energy density is set in accordance with the type of said surface material so as to remove said surface material.

12. A laser beam machining device comprising:

irradiating means for condensing and focusing a laser beam into a high energy density and for irradiating a leading end of the laser beam in focus along a machining locus;

a preliminary machining means for pretreating a workpiece by controlling said irradiating means under preliminary machining conditions so as to obtain a first energy density and a first energy distribution for removing a surface material of the workpiece along said machining locus; and a main machining means for controlling said irradiating means to further irradiate the laser beam to an area of the workpiece from which the surface material has been removed under control of said preliminary machining means, under main machining conditions so as to obtain a second energy density and a second energy distribution different from said first energy distribution of the laser beam different from said first energy density, for machining the workpiece.

13. The laser beam machining device as set forth in claim 12, wherein said first density is lower than said second energy density.

14. A laser beam machining device as set forth in claim 12, wherein:

the surface material is one of a zinc-aluminum alloy, a zinc-nickel alloy, an iron-zinc alloy and zinc; and the first energy density is set in accordance with the type of said surface material so as to remove said surface material.

15. A laser beam machining method comprising a preliminary machining step for pretreating a workpiece and a main machining step for machining the workpiece along a final machining locus;

the preliminary machining step including steps for irradiating a laser beam along the final machining locus, under preliminary machining conditions so as to evenly obtain an energy density and an energy distribution different from an energy density and an energy distribution in at least one of main machining conditions for cutting and welding and thermal treatment in the main machining step, so as to remove beforehand a surface material of the workpiece; and the main machining step including a step for irradiating the laser beam to an area of the workpiece on which the surface substance has been removed, while changing the energy density and the energy distribution of the laser beam according to the main machining condition, so as to machine the workpiece.

16. A laser beam machining method as set forth in claim 15, wherein:

the surface material is one of a zinc-aluminum alloy, a zinc-nickel alloy, an iron-zinc alloy and zinc; and the energy density and the energy density distribution of the laser beam in the preliminary machining step is set in accordance with the type of said surface material so as to remove said surface material.

17. A laser beam machining device comprising:

irradiating means for irradiating a laser beam along a machining locus;

a preliminary machining control means for controlling pretreating a workpiece and a main machining control means for controlling machining the workpiece along a final machining locus;

the preliminary machining control means controlling said irradiating means to irradiate the laser beam along the final machining locus under preliminary conditions so as to evenly obtain an energy density and an energy distribution different from an energy density and an energy distribution in at least one of main machining conditions for cutting and welding and thermal treatment of the workpiece, so as to remove a surface substance of the workpiece; and the main machining control means including means for controlling said irradiating means to further irradiate the laser beam to an area of the workpiece on which the surface substance has been removed by said irradiating means under the control of said preliminary machining means, while changing the energy density and the energy distribution of the laser beam according to the main machining condition, so as to machine the workpiece.

18. A laser beam machining device as set forth in claim 17, wherein:

the surface material is one of a zinc-aluminum alloy, a zinc-nickel alloy, an iron-zinc alloy and zinc; and the energy density and the energy density distribution of the laser beam in the preliminary machining step is set in accordance with the type of said surface material so as to remove said surface material.

19. A laser beam machining device, comprising:

a laser oscillator outputting a laser beam to be guided on a surface of a workpiece; and a control unit including:
  preliminary machining command means for outputting a command for a preliminary machining,
  main machining command means for outputting a command for a main machining, and
  energy density computing means for variably determining an energy density and an energy distribution of the laser beam of the laser oscillator in the preliminary machining and the main machining in accordance with a machining condition, the control unit generating a control command for the laser oscillator using the command for a preliminary machining output by the preliminary machining command means, the command for a main machining output by the main machining command means and the energy density and the energy distribution determined by said energy density computing means.

20. A laser beam machining device as set forth in claim 19, further comprising data base means for storing data for the preliminary machining of the workpiece corresponding to machining parameters, the energy density computing means reading data to be input therein for the preliminary machining and the main machining.

* * * * *